(12) United States Patent
Fujiki et al.

(10) Patent No.: US 10,886,515 B2
(45) Date of Patent: Jan. 5, 2021

(54) ALL-SOLID SECONDARY BATTERY AND METHOD OF PREPARING THE SAME

(71) Applicant: Samsung Electronics Co., Ltd., Suwon-si (KR)

(72) Inventors: Satoshi Fujiki, Yokohama (JP); Takanobu Yamada, Yokohama (JP); Tomoyuki Shiratsuchi, Yokohama (JP); Yuichi Aihara, Yokohama (JP)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 232 days.

(21) Appl. No.: 15/990,898

(22) Filed: May 29, 2018

(65) Prior Publication Data
US 2018/0351159 A1 Dec. 6, 2018

(30) Foreign Application Priority Data

May 30, 2017 (JP) .................................. 2017-106438
Jun. 30, 2017 (KR) ........................ 10-2017-0083606
May 29, 2018 (KR) ........................ 10-2018-0061192

(51) Int. Cl.
*H01M 2/16* (2006.01)
*H01M 4/133* (2010.01)
(Continued)

(52) U.S. Cl.
CPC ......... *H01M 2/1673* (2013.01); *H01M 4/131* (2013.01); *H01M 4/133* (2013.01); *H01M 4/134* (2013.01); *H01M 4/366* (2013.01); *H01M 4/382* (2013.01); *H01M 4/622* (2013.01); *H01M 4/625* (2013.01); *H01M 4/661* (2013.01); *H01M 10/04* (2013.01); *H01M 10/052* (2013.01);
(Continued)

(58) Field of Classification Search
CPC .... H01M 2/1673; H01M 4/133; H01M 4/661; H01M 4/382; H01M 4/131; H01M 4/134; H01M 4/622; H01M 4/625; H01M 4/623; H01M 10/052; H01M 10/0562; H01M 10/058; H01M 10/04; H01M 10/0585; H01M 2004/028; H01M 2004/027; H01M 2004/021
See application file for complete search history.

(56) References Cited

U.S. PATENT DOCUMENTS 9,634,358 B2 4/2017 Matsushita
9,882,234 B2 1/2018 Kosaka et al.
(Continued)

FOREIGN PATENT DOCUMENTS

| JP | 2004311108 A | 11/2004 |
|---|---|---|
| JP | 2015118870 A | 6/2015 |
| JP | 2015125872 A | 7/2015 |

(Continued)

*Primary Examiner* — Laura Weiner
(74) *Attorney, Agent, or Firm* — Cantor Colburn LLP

(57) ABSTRACT

An all-solid secondary battery including: a cathode including a cathode active material layer; an anode including an anode active material layer; and a solid electrolyte layer including a sulfide solid electrolyte between the cathode active material layer and the anode active material layer, wherein an arithmetic mean roughness (Ra) of an interface between the cathode active material layer and the solid electrolyte layer is about 1 micrometer or less, and a relative density of the solid electrolyte layer is about 80% or more.

20 Claims, 8 Drawing Sheets

(51) Int. Cl.
  *H01M 10/052*    (2010.01)
  *H01M 10/0562*   (2010.01)
  *H01M 10/058*    (2010.01)
  *H01M 4/66*      (2006.01)
  *H01M 4/36*      (2006.01)
  *H01M 4/38*      (2006.01)
  *H01M 4/131*     (2010.01)
  *H01M 4/134*     (2010.01)
  *H01M 4/62*      (2006.01)
  *H01M 10/04*     (2006.01)
  *H01M 4/02*      (2006.01)
  *H01M 10/0585*   (2010.01)

(52) U.S. Cl.
  CPC ..... *H01M 10/058* (2013.01); *H01M 10/0562* (2013.01); *H01M 4/623* (2013.01); *H01M 10/0585* (2013.01); *H01M 2004/021* (2013.01); *H01M 2004/027* (2013.01); *H01M 2004/028* (2013.01)

(56) References Cited

U.S. PATENT DOCUMENTS

2015/0325834 A1    11/2015  Kato
2016/0329539 A1*   11/2016  Kawaji ................ H01M 2/168

FOREIGN PATENT DOCUMENTS

| JP | 5850154 B2 | 12/2015 |
| JP | 201710816 A | 1/2017 |
| WO | 2014010042 A1 | 1/2014 |

* cited by examiner

ALL-SOLID SECONDARY BATTERY AND METHOD OF PREPARING THE SAME

CROSS-REFERENCE TO RELATED APPLICATIONS

This application claims priority to and the benefit of Japanese Patent Application No. 2017-106438, filed on May 30, 2017, in the Japanese Patent Office, Korean Patent Application No. 10-2017-0083606, filed on Jun. 30, 2017, and Korean Patent Application No. 10-2018-0061192, filed on May 29, 2018, in the Korean Intellectual Property Office, and all the benefits accruing therefrom under 35 U.S.C. § 119, the contents of which are incorporated herein in their entirety by reference.

BACKGROUND

1. Field

The present disclosure relates to an all-solid secondary battery and a method of preparing the all-solid secondary battery.

2. Description of the Related Art

In recent years, all-solid secondary batteries have received attention. An all-solid secondary battery includes a cathode active material layer, an anode active material layer, and a solid electrolyte layer between the cathode active material layer and the anode active material layer. In the all-solid secondary battery, a solid electrolyte is a medium that conducts lithium ions.

In order to increase an energy density of the all-solid secondary battery, lithium metal may be used as an anode active material. When the lithium metal is used as an anode active material, the all-solid secondary battery may be manufactured in a flat shape and may have an increased output.

Since the medium that conducts lithium ions in the all-solid secondary battery is a solid electrolyte, the battery performance can be improved by densifying particles constituting the all-solid secondary battery. Also, to increase an energy density of the all-solid secondary battery, the solid electrolyte layer may be manufactured in a form of a thin-film. Nonetheless, there remains a need for an improved all-solid secondary battery and methods of manufacturing the same.

SUMMARY

Provided are an improved all-solid secondary battery and a method of preparing the all-solid secondary battery, wherein the all-solid secondary battery may prevent a short-circuit when lithium metal is included in an anode active material layer.

Additional aspects will be set forth in part in the description which follows and, in part, will be apparent from the description, or may be learned by practice of the presented embodiments.

According to an aspect of an embodiment, an all-solid secondary battery includes: a cathode including a cathode active material layer; an anode including an anode active material layer; and a solid electrolyte layer comprising a sulfide solid electrolyte between the cathode active material layer and the anode active material layer, wherein an arithmetic mean roughness (Ra) of an interface between the cathode active material layer and the solid electrolyte layer is about 1 micrometer (µm) or less, and a relative density of the solid electrolyte layer is about 80% or more.

Also disclosed is an all-solid secondary battery including: a cathode including a cathode active material layer; an anode including an anode current collector, an anode active material layer on the anode current collector, wherein the anode active material layer comprises a carbon, and a plated layer between the anode current collector and the anode active material layer, wherein the plated layer comprises lithium; and a solid electrolyte layer between the cathode active material layer and the anode active material layer, wherein an arithmetic mean roughness of an interface between the cathode active material layer and the solid electrolyte layer is about 1 micrometer or less, and a relative density of the solid electrolyte layer is about 80% or more.

According to this perspective, since an arithmetic mean roughness (Ra) of an interface between the cathode active material layer and the solid electrolyte layer is about 1 micrometer (µm) or less, a current may flow evenly in the solid electrolyte layer during charge of the all-solid secondary battery. Therefore, the lithium metal evenly precipitates on the anode active material layer, and thus a short-circuit may not occur. Also, since a relative density of the solid electrolyte layer is about 80% or greater, a gap between the solid electrolyte layers may be reduced. In this regard, a short-circuit may not occur.

In some embodiments, a relative density of the cathode active material layer may be about 60% or more.

According to this perspective, characteristics of the all-solid secondary battery may improve.

Also, a maximum height roughness (Rz) of an interface between the cathode active material layer and the solid electrolyte layer may be about 4.5 µm or less.

According to this perspective, a current may flow more uniformly in the solid electrolyte layer during charge of the all-solid secondary battery. Therefore, lithium metal evenly precipitate on the anode active material layer, and thus a short-circuit may not occur.

In some embodiments, a thickness of the solid electrolyte layer may be about 100 µm or less.

According to this perspective, an energy density of the all-solid secondary battery may improve.

According to an aspect of an embodiment, a method of preparing an all-solid secondary battery includes: providing a cathode active material layer; providing an anode active material layer; providing a solid electrolyte layer comprising the sulfide solid electrolyte; pre-pressing the cathode active material layer and the solid electrolyte; and pressing an electrode stack including the pre-pressed cathode active material layer, the pre-pressed solid electrolyte layer, and the anode active material layer to prepare the all-solid secondary battery, wherein the pre-pressing of the cathode active material layer and the solid electrolyte includes pressing the cathode active material layer to provide a pressed cathode active material layer before stacking the pressed cathode active material layer on the solid electrolyte layer; and pressing the solid electrolyte layer to provide a pressed solid electrolyte layer before stacking the pressed solid electrolyte layer on the anode active material layer.

According to this perspective, an all-solid secondary battery having improved battery performance may be manufactured.

Here, in the pressing of the cathode active material layer, the cathode active material layer may be pressed together with a cathode current collector.

According to this perspective, an all-solid secondary battery having improved battery performance may be manufactured.

Also, the pressing of the solid electrolyte layer may include pressing the solid electrolyte alone, in which the solid electrolyte layer is pressed, before stacking the pressed cathode active material layer.

According to this perspective, an all-solid secondary battery having improved battery performance may be manufactured.

Also, the pressing of the solid electrolyte may include the pressing of the solid electrolyte layer alone; and pressing a first intermediate stack, which is a stack of the pressed solid electrolyte layer, which is provided by the pressing of the solid electrolyte layer alone, and the pressed cathode active material layer, which is provided by the pressing of the cathode active material layer.

According to this perspective, an all-solid secondary battery having improved battery performance may be manufactured.

Also, the pressing of the solid electrolyte may include pressing of the solid electrolyte layer alone; and pressing a second intermediate stack, which is a stack of the solid electrolyte layer, and the pressed cathode active material layer that is pressed in the pressing of the cathode active material layer.

According to this perspective, an all-solid secondary battery having improved battery performance may be manufactured.

Also disclosed is a method of preparing the all-solid secondary battery of claim 19, the method including: providing a cathode including a cathode active material layer; disposing a solid electrolyte layer on the cathode; disposing an anode on the solid electrolyte layer, the anode including an anode current collector and an anode active material layer on the anode current collector, wherein the anode active material layer includes a carbon; and providing a voltage between the cathode and the anode to form a plating layer between the anode active material layer and the anode current collector and prepare the all-solid secondary battery.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1A:
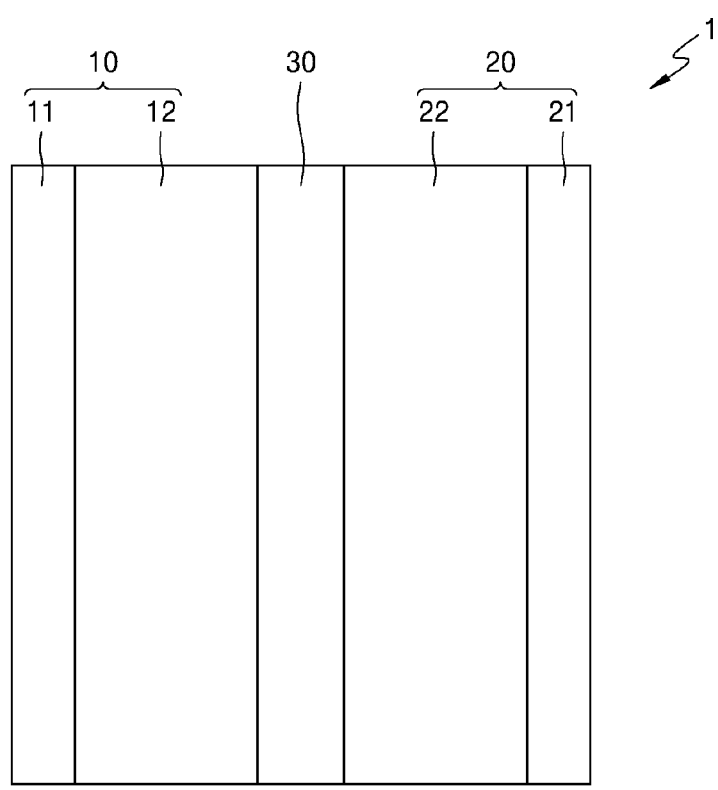
FIG. 1A is a schematic structure of an embodiment of an all-solid secondary battery.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third," etc. may be used herein to describe various elements, components, regions, layers, and/or sections, these elements, components, regions, layers, and/or sections should not be limited by these terms. These terms are only used to distinguish one element, component, region, layer or section from another element, component, region, layer, or section. Thus, "a first element," "component," "region," "layer," or "section" discussed below could be termed a second element, component, region, layer, or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

An electrode stack of an all-solid secondary battery, which is a stack of a cathode active material layer, a solid electrolyte layer, and an anode active material layer, is pressed in the manufacture of the all-solid secondary battery. Accordingly, the particles in each of the layers and between the layers may be densified and contacted to each other. Also, the solid electrolyte layer may be in the form of a thin-film.

Lithium metal may be very soft. Thus, when a lithium metal is used as an anode active material, problems may occur. For example, when a gap, such as a crack, is formed in a surface of the solid electrolyte layer, the lithium metal may penetrate the gap when the electrode stack is pressed. Also, when the gap extends from a surface of the solid electrolyte layer to an opposite surface of the solid electrolyte layer, the lithium metal may reach the cathode active material layer. As a result, a short-circuit may occur in the all-solid secondary battery. Also, even when the gap does not extend through the solid electrolyte layer, a distance between the lithium metal penetrating the gap and the cathode active material layer may be shorter than that between the surface of the lithium metal and the cathode active material layer. Therefore, a current may be concentrated at the penetrating part, which may result in a short-circuit.

Further, when surfaces of the cathode active material layer and the solid electrolyte layer are rough, problems may occur. For example, a surface of the cathode active material layer may have a protruding part that protrudes toward the anode active material layer (e.g., lithium metal). Thus, a distance between the protruding part and the anode active material layer may be shorter than that between another part of the cathode active material layer and the anode active material layer during a charging process. Therefore, a current may be concentrated at this protruding part, which may result in a short-circuit during the charging process.

According to this perspective, when lithium metal is used as an anode active material of an all-solid secondary battery, a short-circuit may occur.

1. All-Solid Secondary Battery

Figure 4:
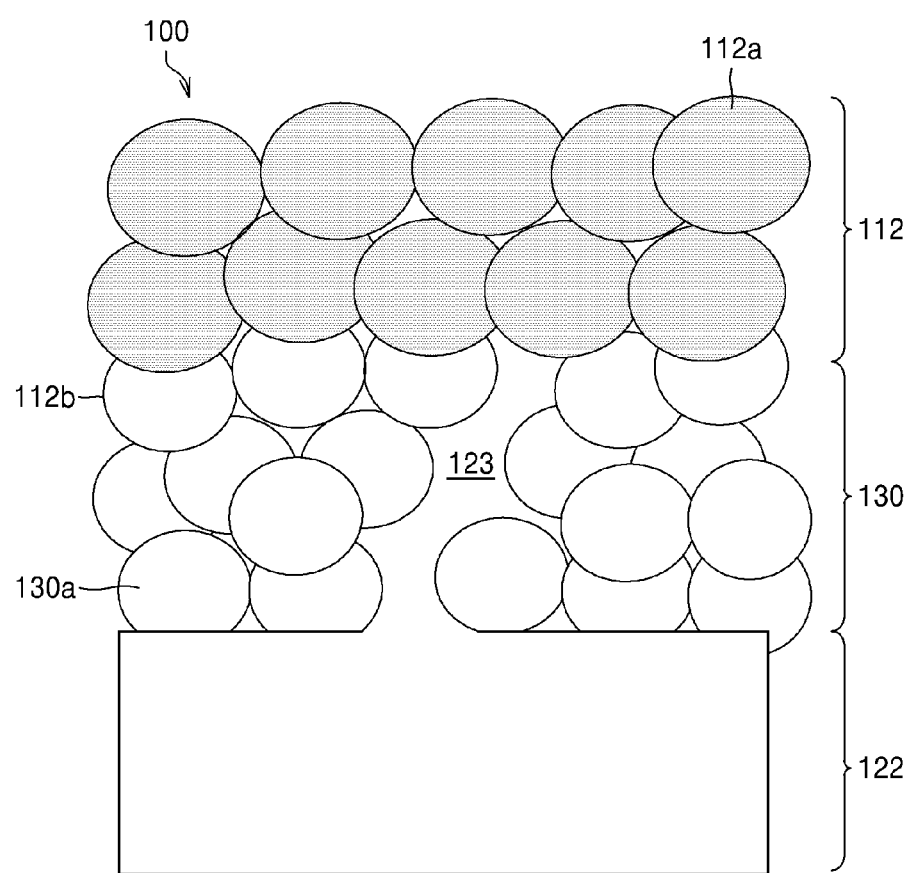
FIG. 4 illustrates problems of an all-solid secondary battery.
Figure 5:
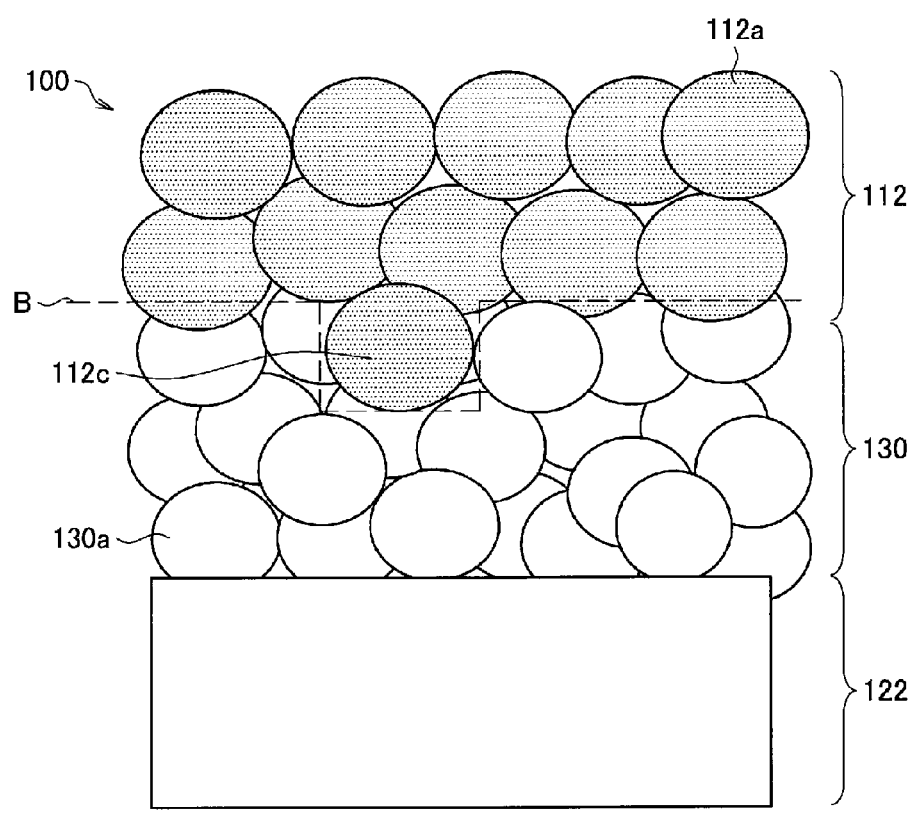
FIG. 5 illustrates problems of an all-solid secondary battery.
Figure 6:
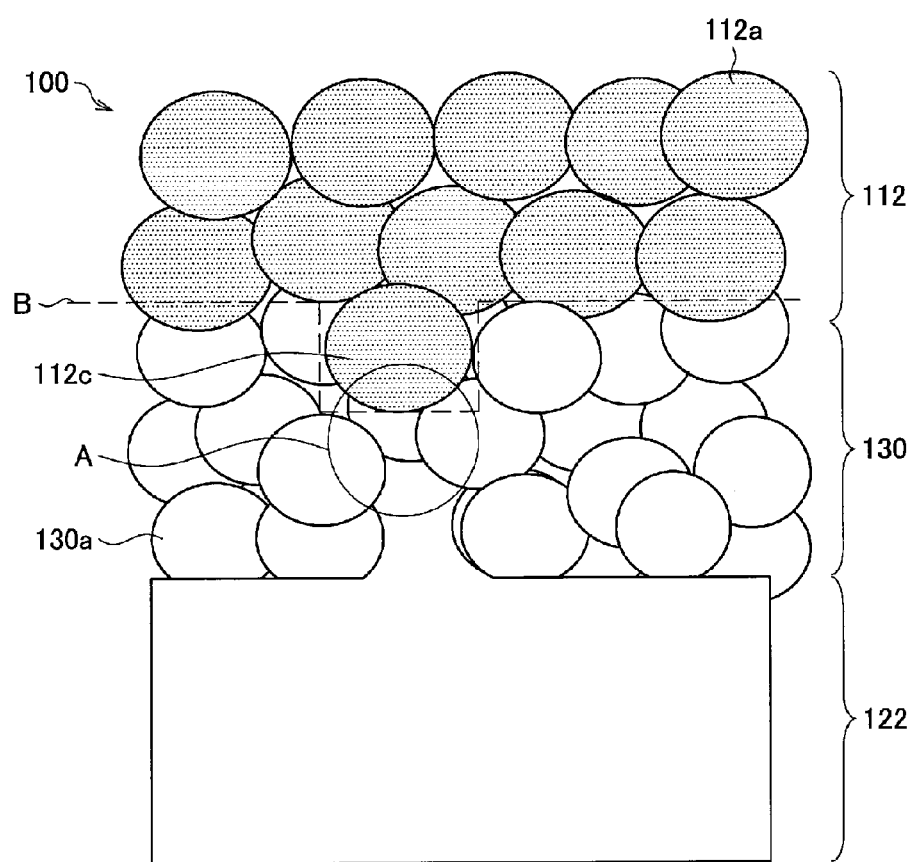
FIG. 6 illustrates problems of an all-solid secondary battery.
Figure 7:
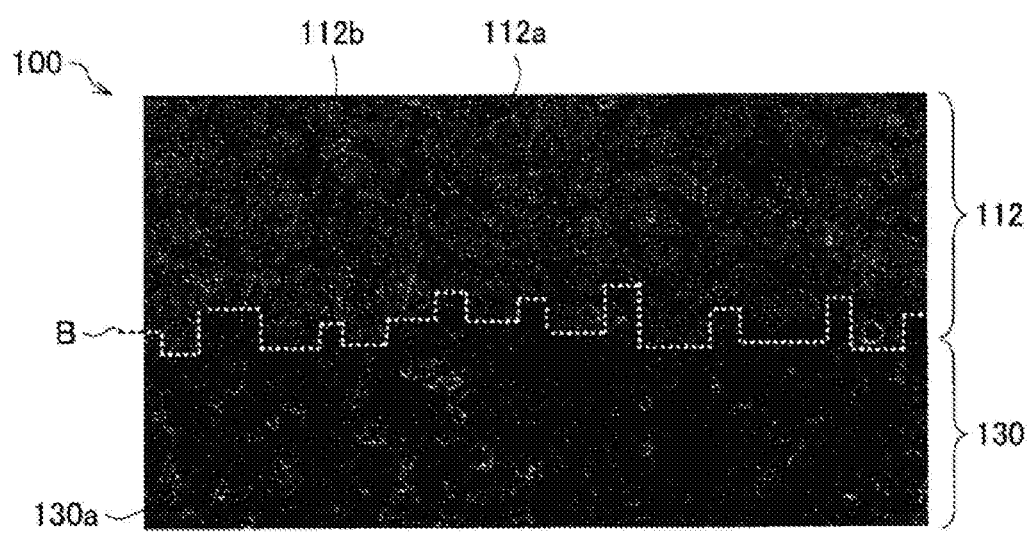
FIG. 7 is a cross-section SEM image that illustrates problems of an all-solid secondary battery.

As shown in FIGS. 4 to 7, an all-solid secondary battery 100 using lithium metal as an anode active material includes a cathode active material layer 112, an anode active material layer 122, and a solid electrolyte layer 130. Here, FIGS. 4 to 6 are views that illustrate structures of the all-solid secondary battery 100, and FIG. 7 is a cross-section scanning electron microscope (SEM) image of the all-solid secondary battery 100 depicted in FIGS. 5 and 6. The cathode active material layer 112 includes a cathode active material 112a and a solid electrolyte 112b. The solid electrolyte layer 130 includes a solid electrolyte 130a. The anode active material layer 122 includes lithium metal.

When a gap 123, such as a crack, is formed in a surface of the solid electrolyte layer 130, a short-circuit may occur. A situation in which a short-circuit occurs will be further described with reference to FIG. 4. As shown in FIG. 4, the solid electrolyte layer 130 has a gap 123 that communicates a top surface and a bottom surface (e.g., extends from a top surface of the solid electrolyte layer 130 to a bottom surface of the solid electrolyte layer 130). When an electrode stack, which is a stack of the cathode active material layer 112, the anode active material layer 122, and the solid electrolyte layer 130, is pressed, lithium metal (of the anode active material layer 122) may penetrate the gap of the solid electrolyte layer 130. Since this gap communicates a surface to an opposite surface of the solid electrolyte layer 130 (e.g., extends from a first surface of the solid electrolyte layer 130 to an opposite second surface of the solid electrolyte layer 130, the lithium metal may reach the cathode active material layer 112 to form a short-circuit in the all-solid secondary battery 100. Also, even when the gap does not fully communicate the first surface to the opposite second surface of the solid electrolyte layer 130, a distance between the lithium metal penetrating the gap and the cathode active material layer 112 is shorter than that between other lithium metal and the cathode active material layer 112. Therefore, electrical current may be concentrated at this part near the gap (e.g., the penetrating part) during a charging process, which may result in a short-circuit.

When an interface between the cathode active material layer 112 and the solid electrolyte layer 130 is rough, a short-circuit may occur. A situation in which a short-circuit occurs will be further described with reference to FIGS. 5 to 7. An interface B between the cathode active material layer 112 and the solid electrolyte layer 130 is rough, and thus a protruding part 112c is formed on a surface of the cathode active material layer 112. Thus, a distance between the protruding part 112c and the anode active material layer 122 is shorter than a distance between another part of the cathode active material layer 112 and the anode active material layer 122. Accordingly, during a charging process, electrical current may be concentrated at this part (e.g., indicated region A in FIG. 6). That is, a large electrical current density flows in a portion such as indicated region A. As a result, the lithium metal may precipitate in the corresponding part, e.g., on a surface thereof, and thus a short-circuit may occur.

It has been surprisingly discovered that increasing a density of the solid electrolyte layer 130 and flattening an interface between the cathode active material layer 112 and the solid electrolyte layer 130 may prevent a short-circuit. When a density of the solid electrolyte layer 130 is large, gaps in the solid electrolyte layer 130 may fewer in number and size. Further, when an interface between the cathode active material layer 112 and the solid electrolyte layer 130 is flat, a chance of topical, e.g., surface, flow of a large current may decrease. Hereinafter, an embodiment will be further described.

2. Standard of Evaluation: Structure of all-Solid Secondary Battery

Figure 1B:
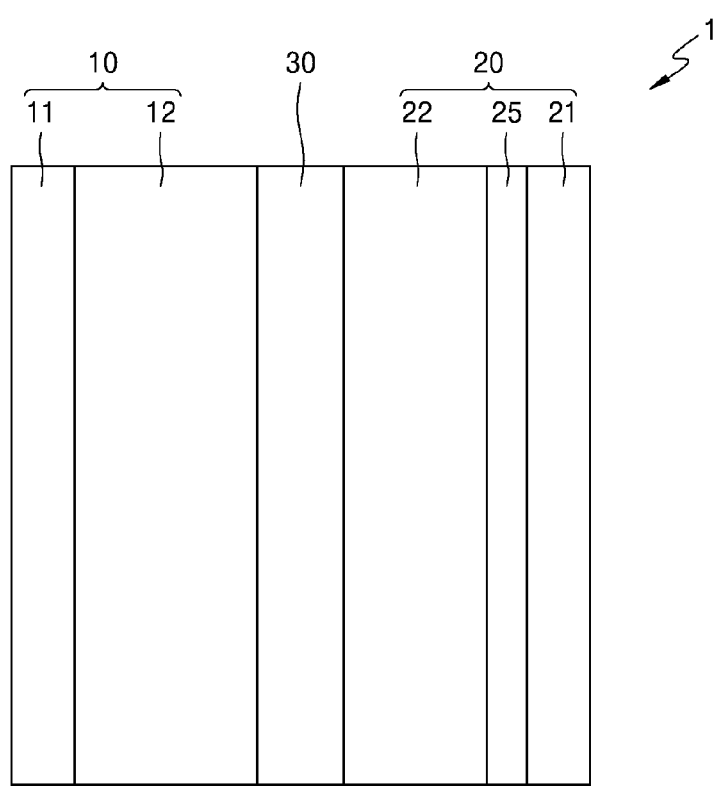
FIG. 1B is a schematic structure of an embodiment of an all-solid secondary battery.

Next, a structure of an all-solid secondary battery 1 according to an embodiment will be further described with reference to FIGS. 1A to 3. As shown in FIG. 1A, the all-solid secondary battery 1 includes a cathode 10, an anode 20, and a solid electrolyte layer 30. In an embodiment, the anode 20 of the all-solid secondary battery comprises an anode active material layer 22 on an anode current collector 21. As shown in FIG. 1B, after charge, the all-solid secondary battery further includes a plating layer between the anode active material layer 22 and the anode current collector 21.

2-1. Cathode

The cathode 10 includes a cathode current collector 11 and a cathode active material layer 12. For example, the cathode current collector 11 may be in the form of a plate or a thin-film, and may comprise indium (In), copper (Cu), magnesium (Mg), stainless steel, titanium (Ti), iron (Fe), cobalt (Co), nickel (Ni), zinc (Zn), aluminum (Al), germanium (Ge), lithium (Li), or an alloy thereof. A combination comprising at least one of the foregoing may be used. The cathode current collector 11 may be omitted.

The cathode active material layer 12 may include a cathode active material 12a and a solid electrolyte 12b. In this case, a resistance between the cathode active material layer 12 and the solid electrolyte layer 30 may decrease. Also, the solid electrolyte 12b included in the cathode 10 may be the same as or different from the solid electrolyte 12b included in the solid electrolyte layer 30. Details about the solid electrolyte 12b will be provided in description of the solid electrolyte layer 30.

The cathode active material 12a may be a cathode active material capable of reversibly intercalating and deintercalating lithium ions. For example, the cathode active material may be suitable material in the art, for example, may be at least one of a composite oxide of lithium with cobalt, manganese, nickel, or a combination thereof. In some embodiments, the cathode active material may be a compound represented by any of the following formulae:

$Li_aA_{1-b}B'_bD'_2$ (where $0.90 \leq a \leq 1.8$, and $0 \leq b \leq 0.5$); $Li_aE_{1-b}B'_bO_{2-c}D'_c$ (where $0.90 \leq a \leq 1.8$, $0 \leq b \leq 0.5$, and $0 \leq c \leq 0.05$); $LiE_{2-b}B'_bO_{4-c}D'_c$ (where $0 \leq b \leq 0.5$, and $0 \leq c \leq 0.05$); $Li_aNi_{1-b-c}Co_bB'_cD'_\alpha$ (where $0.90 \leq a \leq 1.8$, $0 \leq b \leq 0.5$, $0 \leq c \leq 0.05$, and $0 < \alpha \leq 2$); $Li_aNi_{1-b-c}Co_bB'_cO_{2-\alpha}F'_\alpha$ (where $0.90 \leq a \leq 1.8$, $0 \leq b \leq 0.5$, $0 \leq c \leq 0.05$, and $0 < \alpha < 2$); $Li_aNi_{1-b-c}Co_bB'_cO_{2-\alpha}F_2$ (where $0.90 \leq a \leq 1.8$, $0 \leq b \leq 0.5$, $0 \leq c \leq 0.05$, and $0 < \alpha < 2$); $Li_aNi_{1-b-c}Mn_bB'_cD'_\alpha$ (where $0.90 \leq a \leq 1.8$, $0 \leq b \leq 0.5$, $0 \leq c \leq 0.05$, and $0 < \alpha \leq 2$); $Li_aNi_{1-b-c}Mn_bB^1_cO_{2-\alpha}F^1_\alpha$ (where $0.90 \leq a \leq 1.8$, $0 \leq b \leq 0.5$, $0 \leq c \leq 0.05$, and $0 < \alpha < 2$); $Li_aNi_{1-b-c}Mn_bB'_cO_{2-\alpha}F'_2$ (where $0.90 \leq a \leq 1.8$, $0 \leq b \leq 0.5$, $0 \leq c \leq 0.05$, and $0 < \alpha < 2$); $Li_aN i_bE_cG_dO_2$ (where $0.90 \leq a \leq 1.8$, $0 \leq b \leq 0.9$, $0 \leq c \leq 0.5$, and $0.001 \leq d \leq 0.1$); $Li_aNi_bCo_cMn_dGeO_2$ (where $0.90 \leq a \leq 1.8$, $0 \leq b \leq 0.9$, $0 \leq c \leq 0.5$, $0 \leq d \leq 0.5$, and $0.001 \leq e \leq 0.1$); $Li_aNiG_bO_2$ (where $0.90 \leq a \leq 1.8$, and $0.001 \leq b \leq 0.1$); $Li_aCoG_bO_2$ (where $0.90 \leq a \leq 1.8$, and $0.001 \leq b \leq 0.1$); $Li_aMnG_bO_2$ (where $0.90 \leq a \leq 1.8$, and $0.001 \leq b \leq 0.1$); $Li_aMn_2G_bO_4$ (where $0.90 \leq a \leq 1.8$, and $0.001 \leq b \leq 0.1$); $QO_2$; $QS_2$; $LiQS_2$; $V_2O_5$; $LiV_2O_5$; $LiI'O_2$; $LiNiVO_4$; $Li_{(3-f)}J_2(PO_4)_3$ (where $0 \leq f \leq 2$); $Li_{(3-f)}Fe_2(PO_4)_3$ (where $0 \leq f \leq 2$); and $LiFePO_4$.

In the formulae, A may include nickel (Ni), cobalt (Co), manganese (Mn), or a combination thereof; B' may include aluminum (Al), nickel (Ni), cobalt (Co), manganese (Mn), chromium (Cr), iron (Fe), magnesium (Mg), strontium (Sr), vanadium (V), a rare earth element, or a combination thereof; D' may include oxygen (O), fluorine (F), sulfur (S), phosphorus (P), or a combination thereof; E may include cobalt (Co), manganese (Mn), or a combination thereof; F' may include fluorine (F), sulfur (S), phosphorus (P), or a combination thereof; G may include aluminum (Al), chromium (Cr), manganese (Mn), iron (Fe), magnesium (Mg), lanthanum (La), cerium (Ce), strontium (Sr), vanadium (V), or a combination thereof; Q may include titanium (Ti), molybdenum (Mo), manganese (Mn), or a combination thereof; I' may include chromium (Cr), vanadium (V), iron (Fe), scandium (Sc), yttrium (Y), or a combination thereof; and J may include vanadium (V), chromium (Cr), manganese (Mn), cobalt (Co), nickel (Ni), copper (Cu), or a combination thereof.

For example, the cathode active material may be formed by using, for example, lithium cobalt oxide ("LCO"), lithium nickel oxide, lithium nickel cobalt oxide, lithium nickel cobalt aluminum oxide ("NCA"), lithium nickel cobalt manganese oxide ("NCM"), lithium manganate, lithium ion phosphate, nickel sulfide, copper sulfide, sulfur, iron oxide, or vanadium oxide. These examples of the cathode active material may be used alone or in a combination of at least two thereof.

Also, the cathode active material may be include a lithium transition metal oxide that has a layered rock-salt type structure. As used herein, the term "layered" denotes a shape of a thin sheet, and the term "rock-salt type structure" denotes a sodium chloride structure as one of crystal structures in which face-centered cubic lattices respectively formed of anions and cations are shifted by only a half of the side of each unit lattice.

Examples of the lithium transition metal oxide having a layered rock-salt type structure may be lithium ternary transition metal oxides expressed as $LiNi_xCo_yAl_zO_2$ (NCA), $LiNi_xCo_yMn_zO_2$ (NCM), or combinations thereof (where $0<x<1$, $0<y<1$, $0<z<1$, and $x+y+z=1$, and x', y', and z' satisfy $0<x<1$, $0<y<1$, $0<z'<1$, and $x'+y'+z'=1$).

When the cathode active material includes a lithium ternary transition metal oxide having the layered rock-salt type structure, an energy density and thermal stability of the all-solid secondary battery 1 may improve.

The cathode active material may be covered by a coating layer. Here, the coating layer is not limited to but may be any suitable material that can be used as a coating layer of a cathode active material of the all-solid secondary battery according to an embodiment. Examples of the coating layer may include $Li_2O$—$ZrO_2$.

Also, the cathode active material may comprise a lithium ternary transition metal oxide such as NCA or NCM. When the cathode active material includes nickel (Ni), a capacity density of the all-solid secondary battery 1 increases, and thus metal elution from the cathode active material in a charge state may be reduced. As a result, the all-solid secondary battery 1 according to an embodiment may have improved long-term stability and cycle characteristics in a charged state.

Here, a shape of the cathode active material may be, for example, particle shapes such as a true spherical shape or an elliptical spherical shape. Also, a particle diameter of the cathode active material is not particularly limited but may be in a range applicable to a cathode active material of an available all-solid secondary battery. Further, an amount of the cathode active material of the cathode 10 is not particularly limited and may be in a range applicable to a cathode of an available all-solid secondary battery.

Moreover, additives such as a conducting agent, a binder, a filler, a dispersant, and an ion conducting agent may be added to the cathode 10 at an appropriate ratio in addition to the cathode active material and the solid electrolyte 12b.

Examples of the conducting agent that may be added to the cathode 10 may include graphite, carbon black, acetylene black, ketjen black, carbon fibers, and a metal powder. Also, examples of the binder that may be added to the cathode 10 may include styrene butadiene rubber ("SBR"), polytetrafluoroethylene, polyvinylidene fluoride, and polyethylene. Also, the filler, the dispersant, and the ion conducting agent that may be added to the cathode 10 may be materials that are generally used in an electrode of a lithium ion secondary battery.

When the cathode active material layer 12 includes the cathode active material, the solid electrolyte 12b, and the binder, a cell capacity (a capacity per unit cell) of the all-solid secondary battery 1 may increase.

Examples of the binder are a vinylidene fluoride/hexafluoropropylene copolymer, polyvinylidene fluoride ("PVDF"), polyacrylonitrile, polymethylmethacrylate, polytetrafluoroethylene, a styrene butadiene rubber polymer, or a combination thereof, but embodiments are not limited thereto. Any suitable material available as a binder in the art may be used.

Also, a relative density of the cathode active material layer 12 may be about 60% or greater. For example, the relative density of the cathode active material layer 12 may be about 60%, 61%, 62%, 63%, 64%, 65%, 66%, 67%, 68%, 69%, 70%, 71%, 72%, 73%, 74%, 75%, 76%, 77%, 78%, 79%, 80%, 81%, 82%, 83%, 84%, 85%, 86%, 87%, 88%, 89%, 90%, 91%, 92%, 93%, 94%, 95%, 96%, 97%, 98%, or 99% or greater, and less than about 100% or less than about 99.5%, e.g., about 60% to about 99.5%, about 65% to about 98%, or about 70% to about 95%. Relative density, as used herein, is according to Equation 1.

Relative Density=(Measured density/theoretical density)×100%   Equation 1

The measured density may be determined by dividing the mass of a sample of the material by its volume, e.g., by dividing the mass of a pellet of the material by the volume of the pellet. The theoretical density is a density of the material with zero porosity, and can be determined by calculating the density based on a crystal structure of the material, or based on SEM analysis, for example.

In this case, battery performance of the all-solid secondary battery 1 may improve. As noted above, the relative density of the cathode active material layer 12 denotes a ratio of a density to a theoretical density of the cathode active material layer 12. The theoretical density of the cathode active material layer 12 can be calculated based on a theoretical density of each of the materials that constitute the cathode active material layer 12 and a weight ratio of each of the materials. In addition, a content of the cathode active material layer 12 may be measured by observing a cross-section of the cathode active material layer 12 by using an SEM, and the content may be used to determine the relative density.

Here, a method of selecting a relative density of the cathode active material layer 12 to a value within the aforementioned ranges may include a method of pressing the cathode active material layer 12 in the preparation of the all-solid secondary battery 1. In an embodiment, the cathode active material layer 12 is pressed before stacking the cathode active material layer 12 on the solid electrolyte layer 30. In this regard, a relative density of the cathode active material layer 12 may be within the aforementioned ranges, and although it will be described later in the specification, the interface B between the cathode active material layer 12 and the solid electrolyte layer 30 may be manufactured in a flat configuration (see FIGS. 2 and 3). Although an upper limit of the relative density is not particularly limited, when the cathode active material is a crystalline material, such as a lithium transition metal oxide, the relative density may be about 95% or less. When the relative density is greater than about 95%, cracks may be generated in the cathode active material layer 12. Also, when the cracks are generated in the cathode active material layer 12, battery performance may be deteriorated. Further, when the cathode active material is noncrystalline sulfur, a relative density may be less than about 100% or less than about 99.5% due to the restriction of performance of a manufacture device.

2-2. Anode

The anode 20 includes an anode current collector 21 and an anode active material layer 22. For example, the anode current collector 21 may be a plate or a thin-film that is formed of indium (In), copper (Cu), magnesium (Mg), stainless steel, titanium (Ti), iron (Fe), cobalt (Co), nickel (Ni), zinc (Zn), aluminum (Al), germanium (Ge), lithium (Li), or an alloy thereof. The anode current collector 21 may be omitted.

In an embodiment, the anode active material layer 22 comprises lithium metal. The anode active material layer 22 may comprise lithium metal alone or may comprise an alloy of lithium metal and another active metal, e.g., indium (In), aluminum (Al), tin (Sn), silicon (Si), or a combination thereof. In some embodiments, the anode active material layer 22 comprises lithium metal alone. In this regard, an energy density of the all-solid secondary battery 1 may improve.

In an embodiment the anode active material layer 22 comprises a carbon. The carbon may be amorphous or graphitic. Examples of the carbon include ketjen black, carbon black, graphite, carbon nanotubes, carbon fiber, mesoporous carbon, mesocarbon microbeads, oil furnace black, extra-conductive black, acetylene black, lamp black, non-graphitizing carbon, graphitizing carbon, cracked carbon, coke, glassy carbon, and activated carbon. The coke includes pitch coke, needle coke, and petroleum coke. A combination comprising at least one of the foregoing may be used.

The anode active material layer 22 may comprise a binder. Examples of the binder may include, but are not limited to, styrene butadiene rubber (SBR), polytetrafluoroethylene, polyvinylidene fluoride, and polyethylene. A combination comprising at least one of the foregoing may be used.

2-3. Solid Electrolyte Layer

The solid electrolyte layer 30 is disposed between the cathode 10 and the anode 20 and includes a solid electrolyte 30a.

For example, the solid electrolyte 30a comprises a sulfide-based solid electrolyte material. Examples of the sulfide-based solid electrolyte material may include $Li_{7-a}PS_{6-a}X_a$ wherein X is F, Cl, Br, I, or a combination thereof, $0 \leq a < 2$, $aLi_2S\text{-}(1-a)P_2S_5$ wherein $0 < a < 1$, $aLi_2S\text{-}bP_2S_5\text{-}cLiX$ (where X is a halogen atom, e.g., F, Cl, Br, I, or a combination thereof, wherein $0 < a < 1$, $0 < b < 1$, $0 < c < 1$, and $a+b+c=1$, $aLi_2S\text{-}bP_2S_5\text{-}cLi_2O$ wherein $0 < a < 1$, $0 < b < 1$, $0 < c < 1$, and $a+b+c=1$, $aLi_2S\text{-}bP_2S_5\text{-}cLi_2O\text{-}dLiI$ wherein $0 < a < 1$, $0 < b < 1$, $0 < c < 1$, $0 < d < 1$ and $a+b+c+d=1$, $aLi_2S\text{-}(1-a)$ SiS$_2$ wherein 0<a<1, aLi2$_S$-bSiS$_2$-cLiI 0<a<1, 0<b<1, 0<c<1, and a+b+c=1, aLi$_2$S-bSiS$_2$-cLiBr wherein 0<a<1, 0<b<1, 0<c<1, and a+b+c=1, aLi$_2$S-bSiS$_2$-cLiCl wherein 0<a<1, 0<b<1, 0<c<1, and a+b+c=1, aLi$_2$S-bSiS$_2$-cB$_2$S$_3$-dLiI wherein 0<a<1, 0<b<1, 0<c<1, 0<d<1 and a+b+c+d=1, aLi$_2$S-bSiS$_2$-cP$_2$S$_5$-dLiI wherein 0<a<1, 0<b<1, 0<c<1, 0<d<1 and a+b+c+d=1, aLi$_2$S-(1-a)B$_2$S$_3$ wherein 0<a<1, aLi$_2$S-bP$_2$S$_5$-cZ$_m$S$_n$ (where m and n are each independently positive integers between 1 and 10, Z is Ge, Zn, or Ga, and wherein 0<a<1, 0<b<1, 0<c<1, and a+b+c=1), aLi$_2$S-(1-a)GeS$_2$ wherein 0<a<1, aLi$_2$S-bSiS$_2$-cLi$_3$PO$_4$ wherein 0<a<1, 0<b<1, 0<c<1, and a+b+c=1, and aLi$_2$S-bSiS$_2$-cLi$_p$MO$_q$ (where p and q are each independently positive integers between 1 and 10, wherein 0<a<1, 0<b<1, 0<c<1, and a+b+c=1, and M is P, Si, Ge, B, Al, Ga, or In). Here, the sulfide-based solid electrolyte material is prepared by melting and quenching starting materials (for example, Li$_2$S or P$_2$S$_5$), or mechanical milling the starting materials. Subsequently, additional heat treatment can be performed. The solid electrolyte may be amorphous or crystalline and may be a mixed form thereof.

Also, the solid electrolyte 30a may include sulfur (S), phosphorus (P), and lithium (Li), as component elements in the sulfide-based solid electrolyte material, and, for example, Li$_2$S—P$_2$S$_5$ may be used as the solid electrolyte 30a.

Here, when Li$_2$S—P$_2$S$_5$ is used as a sulfide-based solid electrolyte material that forms the solid electrolyte 30a, a molar ratio of Li$_2$S and P$_2$S$_5$ (Li$_2$S:P$_2$S$_5$) may be, for example, in a range of about 50:50 to about 90:10. Also, the solid electrolyte layer 30 may further include a binder. The binder included in the solid electrolyte layer 30 may comprise butadiene rubber (SBR), polytetrafluoroethylene, polyvinylidene fluoride, polyethylene, or a combination thereof. The binder included in the solid electrolyte layer 30 may be the same as or different from the binder included in the cathode active material layer 12.

A relative density of the solid electrolyte layer 30 may be about 80% or greater. For example, a relative density of the solid electrolyte layer 30 may be about 80%, 81%, 82%, 83%, 84%, 85%, 86%, 87%, 88%, 89%, 90%, 91%, 92%, 93%, 94%, 95%, 96%, 97%, 98%, or 99% or greater, and less than about 100% or about 99.5% or less, e.g., about 80% to about 99.5%, or about 85% to about 98%.

In this case, gaps in the solid electrolyte layer 30 may be reduced in number and size. Thus, a short-circuit may be prevented. Here, a relative density of the solid electrolyte layer 30 denotes a ratio of a measured density to a theoretical density of the solid electrolyte layer 30. The theoretical density of the solid electrolyte layer 30 can be calculated based on a theoretical density of each of materials that constitute the solid electrolyte layer 30 and a weight ratio of each of the materials. In addition, a content of the solid electrolyte layer 30 may be measured by observing a cross-section of the solid electrolyte layer 30 using an SEM, and the content may be used to provide a relative density.

Here, a method of selecting a relative density of the solid electrolyte layer 30 to a value within the aforementioned ranges may be a method of pressing the solid electrolyte layer 30 in the preparation of the all-solid secondary battery 1. In an embodiment, the solid electrolyte layer 30 is pressed before stacking the solid electrolyte layer 30 on the anode active material layer 22. In this regard, a relative density of the solid electrolyte layer 30 may be within the aforementioned ranges. Although an upper limit of the relative density is not particularly limited, the relative density may be less than 100%, e.g., about 99.5% or less, due to the manufacturing limitations.

Also, a thickness of the solid electrolyte layer 30 may be about 100 micrometers (μm) or less. For example, a thickness of the solid electrolyte layer 30 may be about 100 μm, 95 μm, 90 μm, 85 μm, 80 μm, 75 μm, 70 μm, 65 μm, 60 μm, 55 μm, or 50 μm or less, e.g., about 5 μm to about 100 μm, or 10 μm to about 90 μm, but embodiments are not limited thereto. In this regard, an energy density of the all-solid secondary battery 1 may increase. Also, a method of setting the thickness of the solid electrolyte layer 30 within these ranges may be a method of pressing the solid electrolyte layer 30.

Figure 2:
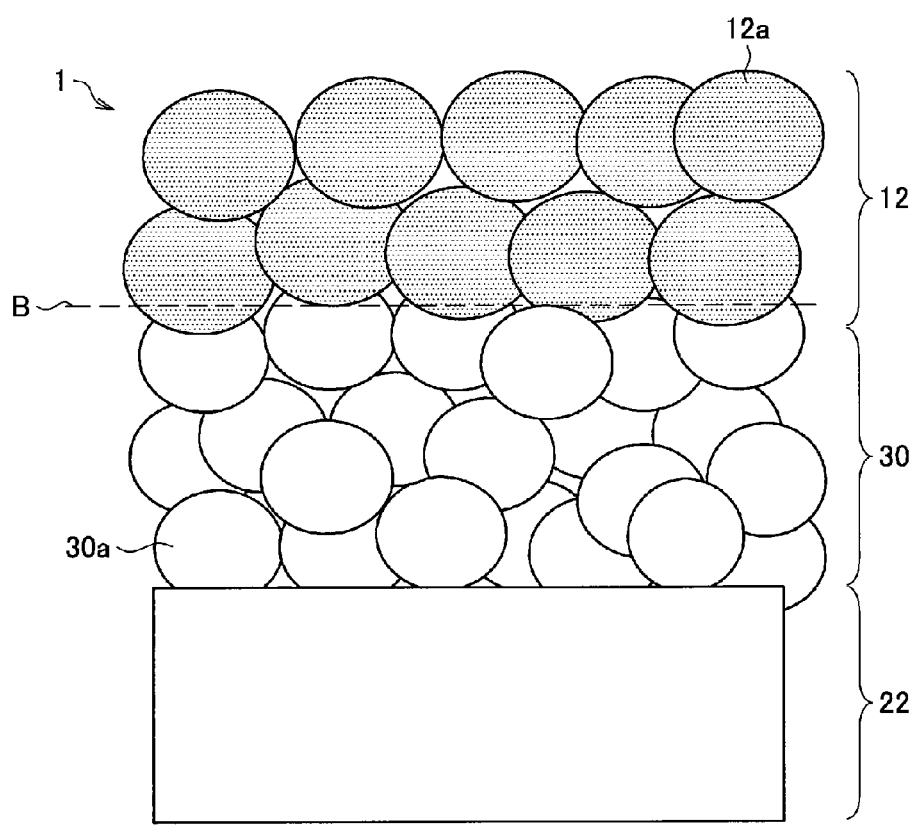
FIG. 2 shows an embodiment of a solid electrolyte layer and its peripheral structure.
Figure 3:
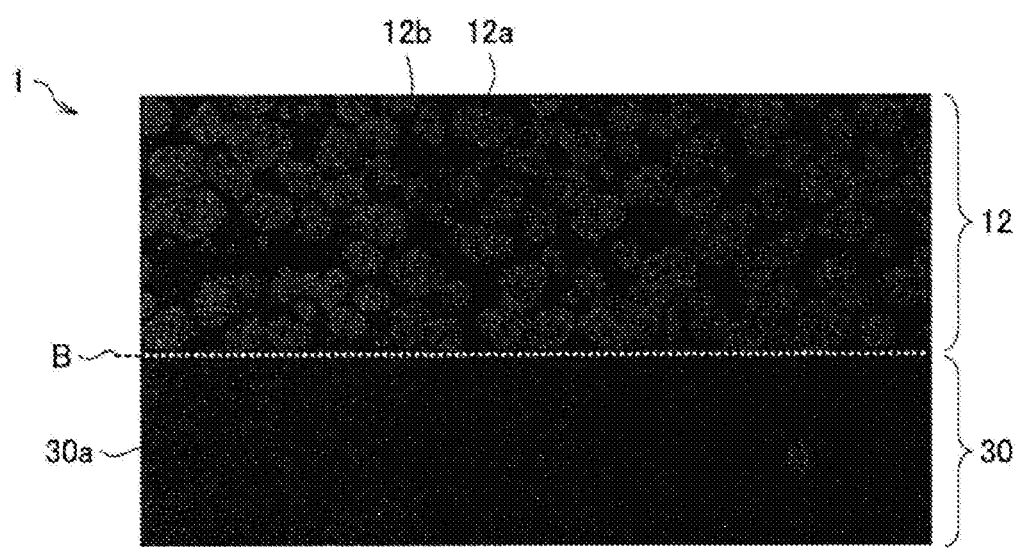
FIG. 3 is a cross-section scanning electron microscope (SEM) image that shows an interface between the solid electrolyte layer and a cathode active material layer and its peripheral structure.

2-4. State of the Interface Between Cathode Active Material Layer and Solid Electrolyte Layer In an embodiment, as shown in FIGS. 2 and 3, the interface B between the cathode active material layer 12 and the solid electrolyte layer is flat. In particular, an arithmetic mean roughness (Ra) of the interface B may be about 1 μm or less. For example, the arithmetic mean roughness (Ra) may be about 1.0 μm, 0.9 μm, 0.8 μm, 0.7 μm, 0.6 μm, 0.5 μm, 0.4 μm, 0.3 μm, 0.2 μm, or 0.1 μm or less, e.g., about 0.01 μm to about 1 μm, about 0.05 μm to about 0.9 μm, about 0.1 μm to about 0.8 μm, or about 0.15 μm to about 7 μm. A maximum height roughness (Rz) of the interface B may be about 4.5 μm or less. For example, the maximum height roughness (Rz) may be about 4.5 μm, 4.4 μm, 4.3 μm, 4.2 μm, 4.1 μm, 4.0 μm, 3.9 μm, 3.8 μm, 3.7 μm, 3.6 μm, 3.5 μm, 3.4 μm, 3.3 μm, 3.2 μm, 3.1 μm, 3.0 μm, 2.9 μm, 2.8 μm, 2.7 μm, 2.6 μm, 2.5 μm, 2.4 μm, 2.3 μm, 2.2 μm, 2.1 μm, 2.0 μm, 1.9 μm, 1.8 μm, 1.7 μm, 1.6 μm, 1.5 μm, 1.4 μm, 1.3 μm, 1.2 μm, 1.1 μm, 1.0 μm, 0.9 μm, 0.8 μm, 0.7 μm, 0.6 μm, 0.5 μm, 0.4 μm, 0.3 μm, 0.2 μm, or 0.1 μm or less, e.g., about 0.01 μm to about 4.5 μm, about 0.05 μm to about 4 μm, or about 0.1 μm to about 3.5 μm.

Statistically, the arithmetic mean roughness (Ra) is an arithmetic mean of a deviation of a roughness curve with respect to a mean line. The maximum height roughness (Rz) is a distance between two parallel lines respectively passing through the highest point and the lowest point of the curve, where the two parallel lines are parallel to the center line of the roughness curve.

Figure 8:
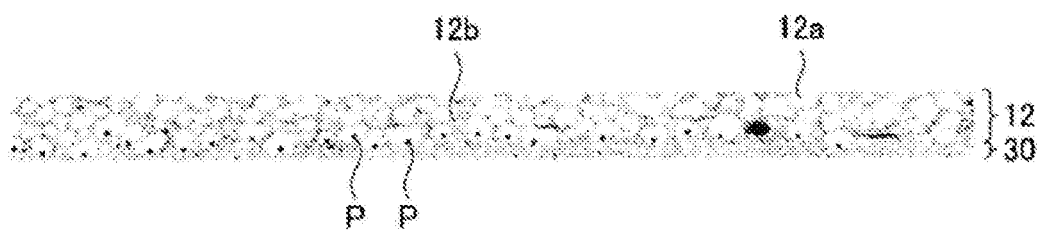
FIG. 8 is a cross-section SEM image that illustrates a method of measuring an arithmetic mean roughness (Ra) of the interface between the solid electrolyte layer and the cathode active material layer.

Here, with reference to FIG. 8, methods of measuring the arithmetic mean roughness (Ra) and the maximum height roughness (Rz) of the interface B will be further described. FIG. 8 shows a cross-section SEM image near the interface B. First, an SEM image of the all-solid secondary battery 1 is obtained. Then, a portion near the interface B (e.g., as shown in FIG. 8) is taken from the cross-section SEM image. Also, this step may be omitted. Next, the cathode active material 12a contacting the solid electrolyte layer 30 is extracted from the cross-section SEM image. Subsequently, a point P closest to the solid electrolyte layer 30 is extracted from the cathode active material 12a. Then, the roughness curve passing through the point P is measured, and the arithmetic mean roughness (Ra) and the maximum height roughness (Rz) are measured based on the roughness curve. Detailed measurement may be performed using ImageJ, an analysis software available from the National Institutes of Health ("NIH", available from the website of https://imagej.nih.gov/ij/). In the following embodiments, the arithmetic mean roughness (Ra) and the maximum height roughness (Rz) were measured by using this method. Further, the roughness curve represents the interface B previously described.

In an embodiment, since the arithmetic mean roughness (Ra) of the interface B is about 1 μm or less, electrical current may more evenly distributed in the solid electrolyte layer 30 during a charging process of the all-solid secondary battery 1. As a result, lithium metal is evenly precipitated on the anode active material layer 22, and thus a short-circuit may be prevented.

Also, the maximum height roughness (Rz) may increase even when the arithmetic mean roughness (Ra) of the interface B is about 1 μm or less. Further, electrical current may be concentrated at a part where the maximum height roughness (Rz) is greater. In this regard, the maximum height roughness (Rz) may be about 4.5 μm or less. Accordingly, a current may evenly flow in the solid electrolyte layer 30 during a charging process of the all-solid secondary battery 1. Since a smaller arithmetic mean roughness (Ra) and maximum height roughness (Rz) are preferable, lower limits of the arithmetic mean roughness (Ra) and the maximum height roughness (Rz) are not particularly limited. However, due to the restriction of performance of a manufacture device, the arithmetic mean roughness (Ra) may be about 0.2 μm or greater, and the maximum height roughness (Rz) may be about 1.5 μm or greater.

3. Method of Preparing Lithium Ion Secondary Battery

Next, a method of preparing the all-solid secondary battery 1 according to an embodiment will be described. The all-solid secondary battery 1 according to an embodiment may be manufactured by providing, e.g., preparing, the cathode 10, the anode 20 and the solid electrolyte layer 30, respectively, and stacking the respective layers. The cathode 10, the anode 20, and the solid electrolyte layer 30 may be prepared by using a method known in the art.

3-1. Cathode Preparation Process

A cathode active material may be prepared by using any suitable method known in the art. The cathode active material thus prepared, a solid electrolyte prepared by a method which will be described later, and various additives are mixed and added to a non-polar solvent to prepare a slurry or paste. Also, the prepared slurry or paste is coated on the cathode current collector 11, and the resultant is dried and roll-pressed to obtain the cathode 10. The cathode 10 may be prepared by press-molding a mixture of a cathode active material and various additives in the form of a pellet without using the cathode current collector 11.

3-2. Anode Preparation Process

The anode 20 is prepared by stacking a metal foil (e.g., lithium metal in the form of a foil), which is an anode active material layer 22, on an anode current collector 21.

When a lithium metal foil is used as the anode active material layer, a battery having a large capacity may be easily manufactured.

3-3. Preparation Process of Solid Electrolyte Layer

The solid electrolyte layer 30 may be prepared by using a solid electrolyte formed of a sulfide solid electrolyte material.

First, a starting material is treated by using a melt quenching method or a mechanical milling method.

For example, when the melt quenching method is used, a predetermined amount of the starting material (for example, $Li_2S$ or $P_2S_5$) is mixed and prepared in the form of a pellet. The pellet was reacted in vacuum at a predetermined reaction temperature, and then the resultant was quenched to prepare a sulfide-based solid electrolyte material. Also, a reaction temperature of the mixture of $Li_2S$ or $P_2S_5$ may be in a range of about 400° C. to about 1,000° C. In an embodiment, the reaction temperature may be in a range of about 800° C. to about 1,000° C. Also, a reaction time may be in a range of about 0.1 hour to about 12 hours. In an embodiment, the reaction time may be in a range of about 1 hour to about 12 hours. Subsequently, a cooling temperature of the resultant may be about 10° C. or less. In an embodiment, the cooling temperature may be about 0° C. or less. A cooling rate may be in a range of about 1° C./second (sec) to about 10,000° C./sec. In an embodiment, the cooling rate may be in a range of about 1° C./sec to about 1,000° C./sec.

When the mechanical milling method is used, a starting material (for example, $Li_2S$ or $P_2S_5$) is stirred and reacted by using a ball mill to prepare a sulfide-based solid electrolyte material. Although the stirring rate and stirring time of the mechanical milling method are not particularly limited, the faster the stirring rate, the faster the sulfide-based solid electrolyte material may be prepared. When the stirring time increases, conversion rate of the starting material to the sulfide-based solid electrolyte material may increase.

Thereafter, the mixed raw materials obtained by the melt quenching method or the mechanical milling method is subjected to heat treatment at a predetermined temperature, followed by pulverization, thereby preparing a solid electrolyte in the form of particles. When the solid electrolyte has a glass transition point, the particles of the solid electrolyte may be amorphous to crystalline by the heat treatment.

Subsequently, the solid electrolyte layer thus obtained is formed into a film by using a film formation method such as an aerosol deposition method, a cold spray method, or a sputtering method, to provide the solid electrolyte layer 30. Also, the solid electrolyte layer 30 is prepared by pressing the solid electrolyte particles. The solid electrolyte layer 30 may be prepared by mixing a solid electrolyte, a solvent, and a binder, and applying, drying, and pressing the resultant. Details of the film formation method can be determined by one of skill in the art without undue experimentation, and thus are not further elaborated upon herein for clarity.

4. Pressing Process

Then, a pressing process is performed. The pressing process according to an embodiment is divided into a pre-pressing process and a primary-pressing process.

4-1. Pre-Pressing Process

In the pre-pressing process, the cathode active material layer and the solid electrolyte layer are pre-pressed. In particular, the pre-pressing process includes a cathode active material layer pressing process and a solid electrolyte layer pressing process.

4-1-1. Cathode Active Material Layer Pressing Process

In the cathode active material layer pressing process, the cathode active material layer 12 is pressed before stacking the cathode active material layer 12 on the solid electrolyte layer 30. Here, the cathode active material layer 12 can be pressed together with the cathode current collector 11. Thus, a surface of the cathode active material layer 12 may be flattened, while the arithmetic mean roughness (Ra) and the maximum height roughness (Rz) of the interface B may be within the ranges described above. When the cathode active material layer 12 and the solid electrolyte layer 30 are pressed after stacking the solid electrolyte layer 30 on the cathode active material layer 12, the arithmetic mean roughness (Ra) and the maximum height roughness (Rz) of the interface B may not be within the ranges described above.

A method of pressing the cathode active material layer 12 is not particularly limited, and a pressing method used in the manufacture of a all-solid secondary battery may be used. For example, the cathode active material layer 12 may be pressed by using a roll-press.

A pressing pressure may vary depending on a pressing device or a material of the cathode active material layer 12. However, the arithmetic mean roughness (Ra) and the maximum height roughness (Rz) of the interface B tend to decrease as the pressing pressure increases, and thus the pressing pressure may be controlled so that the arithmetic mean roughness (Ra) and the maximum height roughness (Rz) may be within the ranges described above.

The cathode active material layer may increase a relative density of an active material through the pre-pressing process. In addition, an interface resistance may decrease by reducing an arithmetic surface roughness of a surface of a cathode including the cathode active material.

4-1-2. Solid Electrolyte Layer Pressing Process

In the solid electrolyte layer pressing process, the solid electrolyte layer (30) is pressed before stacking the solid electrolyte layer 30 on the anode active material layer 22. In this regard, a relative density of the solid electrolyte layer 30 may be within the range described above. Also, when the solid electrolyte layer 30 is stacked on the anode active material layer 22, and then the stack is pressed, the relative density of the solid electrolyte layer 30 may not be within the aforementioned range. The solid electrolyte layer pressing process can be divided into the following three types. Any of the following three types of the pressing process can achieve the effect of the present embodiment, and the second method is most effective among them.

A pressing method for pressing the solid electrolyte layer 30 is not particularly limited, and any suitable pressing method used in the manufacture of an all-solid secondary battery in the art may be used. For example, the solid electrolyte layer 30 may be pressed by using a roll-press.

A pressing pressure may vary depending on a pressing device or a material of the solid electrolyte layer 30. However, the relative density of the solid electrolyte layer 30 tends to increase as the pressing pressure increases, and thus the pressing pressure may be controlled so that the relative density of the solid electrolyte layer 30 may be within the range previously described.

4-1-2-1. First Pressing Method

A first pressing method involves pressing a solid electrolyte layer alone. In the solid electrolyte layer alone process, the solid electrolyte layer 30 is pressed before stacking the solid electrolyte layer 30 on the cathode active material layer 12 that is pressed in the cathode active material layer pressing process. Therefore, in the first method, the solid electrolyte layer 30 is pressed before stacking the solid electrolyte layer 30 on the cathode active material layer 12. Therefore, the relative density of the solid electrolyte layer 30 may be within the range described above. Also, in the first pressing method, the solid electrolyte layer 30 is pressed alone before stacking the solid electrolyte layer 30 on the cathode active material layer 12. In this regard, the relative density of the solid electrolyte layer 30 may be increased for sure. Also, in this pressing process, which will be further described later, since the pressed solid electrolyte layer 30 is stacked on the cathode active material layer 12, the arithmetic mean roughness (Ra) and the maximum height roughness (Rz) of the interface B may be decreased, and since the first method does not include a first intermediate stack pressing process, which will be described later, the relative density of the solid electrolyte layer 30 may decrease to a certain degree compared to the second method.

4-1-2-2. Second Pressing Method

A second pressing method involves the solid electrolyte layer alone pressing process described above and a first intermediate stack pressing process. In the solid electrolyte layer alone pressing process, the solid electrolyte layer 30 is pressed before stacking the solid electrolyte layer 30 on the cathode active material layer 12 pressed in the cathode active material layer pressing process. In the first intermediate stack pressing process, a first intermediate stack, which is a stack of the solid electrolyte layer 30 pressed in the solid electrolyte layer alone pressing process and the cathode active material layer 12 pressed in the cathode active material layer pressing process, is pressed.

In the second pressing method, the solid electrolyte layer 30 is pressed before stacking the solid electrolyte layer 30 on the cathode active material layer 22. Thus, the relative density of the solid electrolyte layer 30 may be within the range described above. Also, in the second pressing method, the solid electrolyte layer 30 is pressed alone before stacking the solid electrolyte layer 30 on the cathode active material layer 12. Therefore, the relative density of the solid electrolyte layer 30 may be increased, and also the arithmetic mean roughness (Ra) and the maximum height roughness (Rz) of the interface B may be decreased.

4-1-2-3. Third Pressing Method

A third pressing method involves pressing a second intermediate stack, which is a stack of the solid electrolyte layer 30 and the cathode active material layer 12 pressed in the cathode active material layer pressing process. The third pressing method is the same as the second method except not including the solid electrolyte layer alone pressing process.

In the third pressing method, the solid electrolyte layer 30 before pressing is stacked on the cathode active material layer 12. Thus, the solid electrolyte layer 30 with a rough surface may be stacked on the cathode active material layer 12. However, the solid electrolyte layer 30 is softer than the cathode active material layer 12, and a surface shape of the solid electrolyte layer 30 may follow a surface shape of the cathode active material layer 12. Therefore, the arithmetic mean roughness (Ra) and the maximum height roughness (Rz) of the interface B may be within the ranges described above. As a result, since the solid electrolyte layer alone pressing process is omitted, the arithmetic mean roughness (Ra) and the maximum height roughness (Rz) of the interface B in the third method may be slightly greater than those of the first and second methods. However, since the solid electrolyte layer 30 is pressed before stacking the solid electrolyte layer 30 on the anode active material layer 22, the effect of the third method may be the same as those produced by the first and second methods.

Also, the relative density s of the cathode active material layer 12 and the solid electrolyte layer 30 may be within the ranges (about 60% or greater or about 80% or greater) described above at the end of the pre-pressing process.

4-2. Primary-Pressing Process

In the primary-pressing process, an electrode stack is prepared by stacking the cathode active material layer 12 (i.e., the cathode 10), the solid electrolyte layer 30, and the anode active material layer 22 (i.e., the anode 20), which are pressed in the pre-pressing process. Then, the electrode stack is pressed. Through these processes, the all-solid secondary battery 1 is manufactured. A specific pressing method for performing the primary-pressing process is not particularly limited, and a pressing method that is used in the manufacture of an all-solid secondary battery may be used. For example, the primary-pressing process may be carried out by using a roll-press.

In an embodiment, an all-solid secondary battery comprising a plated layer between the anode current collector and the anode active material layer may be provided by providing a cathode comprising a cathode active material layer; disposing a solid electrolyte layer on the cathode; disposing an anode on the solid electrolyte layer, the anode comprising an anode current collector and an anode active material layer on the anode current collector, wherein the anode active material layer comprises a carbon; and providing a voltage between the cathode and the anode to form a plating layer between the anode active material layer and the anode current collector.

EXAMPLES

1. Example 1

Hereinafter, examples of an embodiment will be described. In Example 1, an all-solid secondary battery was prepared according to the following process.

1-1. Cathode Preparation

A $LiNi_{0.8}Co_{0.15}Al_{0.5}O_2$ (NCA) three-component powder as a cathode active material, a $Li_2S$—$P_2S_5$ (in a molar ratio of 75:25) crystalline powder as a sulfide solid electrolyte, and a vapor growth carbon fiber powder as a conducting agent were measured so that a weight ratio thereof was 60:35:5 and mixed by using a revolution-rotation mixer to prepare a powder mixture.

Next, a SBR-dissolved dehydrated xylene solution as a binder was added to the powder mixture at an amount of 5.0 percent by weight (wt %) based on the total weight of the powder mixture to prepare a primary mixture. Then, an appropriate amount of dehydrated xylene for controlling a viscosity was added to the primary mixture to prepare a secondary mixture. Further, in order to improve dispersibility of the powder mixture, a zirconia ball having a diameter of 5 millimeters (mm) was added to the secondary mixture so that an empty space, the powder mixture, and the zirconia ball each occupied ⅓ of the total volume of a milling container to prepare a tertiary mixture. The tertiary mixture was added to the revolution-rotation mixer and stirred therein at a rate of 3,000 rotations per minute (rpm) for 3 minutes to prepare a cathode active material layer coating solution.

Subsequently, an aluminum foil current collector having a thickness of 20 μm was prepared as a cathode current collector. The cathode current collector was placed in a desk-top screen printer, and the cathode active material layer coating solution was coated on a sheet by using a metal mask having a thickness of 150 μm and a hole dimension of 2.0 centimeters (cm)×2.0 cm. Thereafter, the sheet coated with the cathode active material layer coating solution was dried on a hot plate of 60° C. for 30 minutes and vacuum dried at 80° C. for 12 hours. Therefore, a cathode active material layer was formed on the cathode current collector. The total thickness of the cathode current collector and the cathode active material layer after the drying process was 165 μm or less or more.

1-2. Preparation of Solid Electrolyte Layer

A SBR-dissolved dehydrated xylene solution was added to the $Li_2S$—$P_2S_5$ (in a molar ratio of 75:25) crystalline powder as a sulfide-based solid electrolyte at an amount of 2.0 wt %, based on the total weight of the powder mixture, to prepare a primary mixture. Then, an appropriate amount of dehydrated xylene for controlling a viscosity was added to the primary mixture to prepare a secondary mixture. Further, in order to improve dispersibility of the powder mixture, a zirconia ball having a diameter of 5 mm was added to the secondary mixture so that an empty space, the powder mixture, and the zirconia ball each occupied ⅓ of the total volume of a milling container to prepare a tertiary mixture. The tertiary mixture was added to the revolution-rotation mixer and stirred therein at a rate of 3,000 rpm for 3 minutes to prepare an electrolyte layer coating solution.

A polyethylene terephthalate ("PET") substrate was placed in a desk-top screen printer, and the electrolyte layer coating solution was coated on the PET substrate by using a metal mask having a thickness of 300 μm with a hole dimension of 2.5 cm×2.5 cm. Thereafter, the PET substrate coated with the cathode active material layer coating solution was dried on a hot plate of 40° C. for 10 minutes and vacuum dried at 40° C. for 12 hours. Therefore, a solid electrolyte layer was formed. The total thickness of the solid electrolyte layer after the drying process was 180 μm or less or more.

1-3. Anode Preparation

A nickel foil current collector having a thickness of 20 μm was prepared as an anode current collector, and a lithium metal foil having a dimension of 2.2 cm×2.2 cm and a thickness of 30 μm was attached to the anode current collector to prepare an anode.

1-4. Standard of Evaluation: Manufacture of all-Solid Secondary Battery

A pre-pressing process in Example 1 was as follows. That is, the cathode was pressed at a pressure of 10 tons by using a uniaxial press device. A cathode active material layer pressing process was thus performed. A volume density of the cathode active material layer after the pressing process was 2.23 grams per cubic centimeter (g/cc). The pressed cathode active material layer was cut by using a Thomson blade having a diameter (ϕ) of 10 mm, and a height and a weight of the cut electrode layer were measured. The volume density of the cathode active material layer was calculated by dividing the weight by a volume of the cut electrode layer.

Next, a solid electrolyte layer pressing process was performed. In Example 1, the second method was used as a process for preparing a solid electrolyte layer. In particular, the solid electrolyte layer was pressed at a pressure of 10 tons by using a uniaxial press device (a solid electrolyte layer alone pressing process). The solid electrolyte layer was pressed together with the PET substrate. A volume density of the solid electrolyte layer after the pressing was 1.53 g/cc. A volume density of the solid electrolyte layer was calculated by using the same method of calculating a volume density of the cathode active material.

Subsequently, the cathode was cut by using a Thomson blade having a diameter (ϕ) of 11 mm, and the solid electrolyte layer on the PET substrate and the cathode were stacked such that the solid electrolyte layer and the cathode active material layer faced each other. Then, the solid electrolyte layer and the cathode were attached to each other by using a roll-press having a roll interval of 150 μm according to a dry lamination method. A first intermediate stack was prepared in this regard. Next, the first intermediate stack was pressed by using a uniaxial press device at a pressure of 10 tons (a first intermediate stack pressing process). After the pressing process, a volume density of the cathode active material was 2.27 g/cc, and a volume density of the solid electrolyte was 1.56 g/cc. Also, a thickness of the solid electrolyte was 90 μm. Through these processes, a pre-pressing process was performed.

Next, relative densities of the cathode active material layer and the solid electrolyte layer were calculated based on the volume densities after the pre-pressing process. In particular, theoretical densities of NCA, a $Li_2S$—$P_2S_5$ (in a molar ratio of 75:25) crystalline powder, and a conducting agent were 4.6 g/cc, 1.8 g/cc, and 2.1 g/cc, each respectively.

Therefore, a theoretical density of the cathode active material layer was 3.50 g/cc (=4.6×0.6+1.8×0.35+2.1×0.05), and a theoretical density of the solid electrolyte layer was 1.8 g/cc. Thus, a relative density of the cathode active material layer was 64.9% (=2.27/3.50), and a relative density of the solid electrolyte layer was 86.7% (=1.56/1.8). Also, in order to simplify the calculating in the present example, the binder was not considered in the calculation of the theoretical densities. Since an amount of binder was relatively small relative to other ingredients, the effect of not considering the binder on the result is insignificant. Also, when the relative density s are within these ranges, relative densities after the primary-pressing process are also be within the ranges described above.

Then, the arithmetic mean roughness (Ra) and the maximum height roughness (Rz) of the interface B were measured as follows. That is, a cross-section of the first intermediate stack was obtained by cutting the first intermediate with an ion milling apparatus (E-3500, Hitachi High-Technologies Corporation). Subsequently, the cross section was observed with an FE-SEM (JSM-7800F, Japan Electronics), and a cross-sectional SEM image was obtained. FIG. 3 is a cross-sectional SEM image of Example 1. Then, the arithmetic mean roughness (Ra) and the maximum height roughness (Rz) of the interface B were measured by the above-described method.

Next, the anode was cut by using a Thomson blade having a diameter (φ) of 13 mm, and the first intermediate stack and the anode were stacked such that the solid electrolyte layer and the anode active material layer faced each other, thereby fabricating an electrode stack. Subsequently, the electrode stack was pressed at a pressure of 3 tons by a uniaxial press device. Therefore, a primary-pressing process was performed. A thickness of the solid electrolyte layer after the primary-pressing process was 85 μm.

Then, the electrode stack after the primary-pressing process was placed in an aluminum laminate film equipped with a terminal and vacuum-evacuated up to 100 pascals (Pa) by using a vacuum. Next, the electrode stack was enclosed in the laminate film by using a heat seal. Therefore, an all-solid secondary battery (a test cell) was manufactured.

1-5. Short-Circuit Occurrence

Whether short-circuit occurred or not in the test cell was evaluated by using an open circuit voltage of the test cell. In particular, a closed circuit voltage of the test cell was measured, and the cell was evaluated as having short-circuit occurrence when the voltage was 2.4 volts (V) or less. The cell evaluated as having short-circuit occurrence did not undergo a cycle life test.

1-6. Cycle Life Test

At a temperature of 45° C., the test cell was charged until an upper limit voltage of 4.0 V with a constant current of 0.13 milliampere (mA) and discharged until a discharge final voltage of 2.5 V with a current of 0.13 mA, and this cycle was repeated 50 times. Also, discharge capacity retention was determined as a discharge capacity of the 50th cycle with respect to a discharge capacity (an initial capacity) of the first cycle. The measurement of the discharge capacity followed a charge/discharge evaluation apparatus, TOSCAT-3100 (available from Dongyang Systems, Japan). The discharge capacity retention was a parameter of cycle characteristics. The greater the value, the better the cycle characteristics were. Characteristics and the evaluation results of Examples and Comparative Examples are shown in Table 1. In an embodiment, a capacity retention of the all-solid secondary battery after 50 charge/discharge cycles may be greater than about 75%.

2. Example 2

The same test with that of Example 1 was performed, except that the third method was used as the solid electrolyte layer pressing process. In particular, a pre-pressing process used in Example 2 was as follows.

The cathode 10 was pressed by using a uniaxial press device at a pressure of 10 tons (a cathode active material layer pressing process). A volume density of the cathode active material layer after the pressing process was 2.26 g/cc.

Subsequently, the cathode was cut by using a Thomson blade having a diameter (φ) of 11 mm, and the solid electrolyte layer on the PET substrate and the cathode were stacked such that the solid electrolyte layer and the cathode active material layer faced each other. Then, the solid electrolyte layer and the cathode were attached to each other by using a roll-press having a roll interval of 150 μm according to a dry lamination method. A second intermediate stack was prepared in this regard. Next, the second intermediate stack was pressed by using a uniaxial press device at a pressure of 10 tons (a second intermediate stack pressing process). After the pressing process, a volume density of the cathode active material was 2.29 g/cc, and a volume density of the solid electrolyte was 1.55 g/cc. Though these processes, a pre-pressing process was performed. Then, the same process used in Example 1 was performed. Also, the arithmetic mean roughness (Ra) and the maximum height roughness (Rz) of the interface B were measured by using the second intermediate stack after the pre-pressing process. The results are shown in Table 1.

3. Example 3

The same test with that of Example 1 was performed, except that the first method was used as the solid electrolyte layer pressing process. In particular, a pre-pressing process used in Example 3 was as follows.

That is, the cathode 10 was pressed by using a uniaxial press device at a pressure of 10 tons (a cathode active material layer pressing process). A volume density of the cathode active material layer after the pressing process was 2.24 g/cc.

Next, the solid electrolyte layer was pressed by using a uniaxial press device at a pressure of 10 tons (a solid electrolyte layer alone pressing process). The solid electrolyte layer is pressed together with the PET substrate. A volume density of the solid electrolyte layer after the pressing process was 1.53 g/cc. Through these processes, a pre-pressing process was performed.

Subsequently, the cathode and the anode were cut with a Thomson blade used in Example 1, and the cathode, the solid electrolyte layer, and the anode were stacked such that the solid electrolyte layer and each of the active material layers faced each other, thereby preparing an electrode stack. Then, the electrode stack was pressed by using a uniaxial press device at a pressure of 3 tons. Therefore, a primary-pressing process was performed. Thereafter, the same test used in Example 1 was performed. Also, the arithmetic mean roughness (Ra) and the maximum height roughness (Rz) of the interface B were measured by using the electrode stack after the primary-pressing process.

4. Example 4

The same test used in Example 1 was performed, except that a pressing pressure of the first intermediate stack pressing process was 15 tons.

5. Example 5

The same test used in Example 1 was performed, except that a pressing pressure of the cathode active material layer pressing process and the solid electrolyte pressing process was 7 tons.

6. Example 6

The same test used in Example 2 was performed, except that a pressing pressure of the cathode active material layer pressing process was 7 tons.

7. Example 7

In Example 7, a cathode active material layer and a solid electrolyte layer were prepared as follows. That is, a cathode active material layer was prepared in the same manner as in Example 4, except that a NCA three-component powder, a $Li_2S-P_2S_5$ (in a molar ratio of 75:25) amorphous powder as a sulfide solid electrolyte, and a vapor growth carbon fiber powder as a conducting agent were measured so that a weight ratio thereof was 90:7:3. Also, a solid electrolyte layer was prepared in the same manner as in Example 4, except that a $Li_2S-P_2S_5$ (in a molar ratio of 75:25) amorphous powder was used as a sulfide-based solid electrolyte.

Further, a pre-pressing process was performed as follows. That is, in vacuum, the cathode was pressed by a uniaxial press device at a pressure of 15 tons (a cathode active material layer pressing process). Subsequently, in vacuum, the solid electrolyte layer was pressed by a uniaxial press device at a pressure of 15 tons (a solid electrolyte layer single press process). Thereafter, the same process as in Example 4 (particularly, a first intermediate stack pressing process) was performed. In this regard, the pre-pressing process was performed. A volume density of the cathode active material layer after the pre-pressing process was 3.82 g/cc. Also, a volume density of the solid electrolyte layer after the pre-pressing process was 1.77 g/cc. Here, a theoretical density of the cathode active material layer was 4.33 g/cc (=4.6×0.9+1.8×0.07+2.1×0.03), and a relative density was 88.2% (=3.82/4.33). Also, a theoretical density of the solid electrolyte layer was 98.3% (=1.77/1.8). Other processes were the same as in Example 4.

8. Example 8

The same test used in Example 1 was performed, except that an anode was prepared as follows.

A thin nickel film having a thickness of 20 μm was prepared as an anode current collector.

In addition, acetylene black (AB) powder having a primary diameter of 35 nm was prepared as an anode active material. 2 g of AB powder was added to a container. Next, an NMP solution in which PVdF was dissolved as a binder was added to the powder mixture so that an amount of PVdF was 3.0 wt % based on the total weight of the powder mixture to prepare a primary mixture. Further, NMP for controlling a viscosity was added in an appropriate amount to the obtained primary mixture to produce a secondary mixture. The resulting secondary mixture was placed in a revolution-rotation mixer and stirred at a rate of 2,000 rpm for 5 minutes to prepare an anode active material coating solution. The resulting slurry was coated on the thin nickel film by using a blade coater, which was then dried on a hot plate at 100° C. for 30 minutes, followed by vacuum-drying at 180° C. for 12 hours.

Through the above process, an anode was prepared. The total thickness of the anode current collector and the anode active material layer after drying was about 30 μm. The all-solid battery prepared in Example 8 was charged once under the same conditions as Example 1.

Thereafter, in a dried atmosphere, the battery was disassembled, and a cross-section of the all-solid battery was polished with an ion milling apparatus. Subsequently, the cross section was observed with an SEM. As a result, it was observed that lithium precipitated at an interface between the thin nickel film and the AB layer due to charging.

9. Comparative Example 1

The same test as in Example 1 was performed, except that the cathode active material layer pressing process and the solid electrolyte layer alone pressing process were not performed. FIG. 7 is a cross-sectional SEM image used in measurement of an arithmetic mean roughness (Ra) and a maximum height roughness (Rz) of Comparative Example 1.

10. Comparative Example 2

The same test as in Example 1 was performed, except that a pressing pressure of every process in the pre-pressing process was 3 tons.

11. Comparative Example 3

The same test as in Example 1 was performed, except that the cathode active material layer pressing process was not performed.

12. Comparative Example 4

The same test as in Example 3 was performed, except that the cathode active material layer pressing process was not performed.

13. Comparative Example 5

The same test as in Example 3 was performed, except that the solid electrolyte layer alone pressing process was not performed.

14. Comparative Example 6

The same test as in Example 1 was performed, except that a metal mask having a thickness of 600 μm was used in the manufacture of a solid electrolyte layer.

15. Comparative Example 7

The same test as in Example 3 was performed, except that the pre-pressing process was not performed. That is, only the primary-pressing process was performed in Comparative Example 7. A volume density and an arithmetic mean roughness (Ra) and a maximum height roughness (Rz) of each of the layers were measured by using the electrode stack after the primary-pressing process.

16. Comparative Example 8

The same test as in Example 8 was performed, except that a cathode active material layer pressing process and a solid electrolyte layer single press process were not performed.

17. Reference Example 1

The same test as in Comparative Example 1 was performed, except that a metal mask having a thickness of 1200 µm was used in the manufacture of a solid electrolyte layer.

18. Reference Example 2

The same test as in Comparative Example 1 was performed, except that an anode was prepared as follows. That is, a graphite powder (vacuum-dried at 80° C. for 24 hours) as an anode active material and polyvinylidene fluoride ("PVdF") as a binder were weighed at a mass ratio of 95.0:5.0. These materials and an appropriate amount of N-methyl-2-pyrrolidone ("NMP") were placed in a revolution-rotation mixer, stirred at a rate of 3,000 rpm for 3 minutes, and then defoamed for 1 minute to prepare an anode active material coating solution.

Next, a nickel foil current collector having a thickness of 20 µm was prepared as an anode current collector, and an electrolyte layer coating solution was coated on a nickel current collector member using a metal mask having a hole dimension of 2.2 cm×2.2 cm and a thickness of 250 µm. The sheet coated with the anode active material layer coating solution was placed in a dryer heated at 80° C. and dried for 15 minutes. In addition, the dried sheet was vacuum-dried at 80° C. for 24 hours. Therefore, an anode was prepared. A thickness of the anode was about 140 µm or less or more.

19. Reference Example 3

In Reference Example 3, a non-aqueous electrolyte secondary battery was prepared as follows. Then, a cycle life test was performed thereon as in Example 1.

19-1. Cathode Preparation

A NCA three-component powder as a cathode active material and acetylene black as a conducting agent were weighed and mixed in a weight ratio of 97:3 to prepare a powder mixture. Next, an NMP solution in which PVdF was dissolved as a binder was added to the powder mixture so that an amount of PVdF was 3.0 wt %, based on the total weight of the powder mixture, to prepare a primary mixture. Further, NMP for controlling a viscosity was added in an appropriate amount to the obtained primary mixture to produce a secondary mixture. The resulting secondary mixture was placed in a revolution-rotation mixer and stirred at a rate of 2,000 rpm for 3 minutes to prepare a cathode active material layer coating solution.

Next, an aluminum foil current collector having a thickness of 20 µm was prepared as a cathode current collector, the cathode current collector was placed in a desk-top screen printer, and the cathode active material layer coating solution was applied on a sheet using a metal mask having a hole dimension of 2.0 cm×2.0 cm and a thickness of 150 µm. Thereafter, the sheet coated with the cathode active material layer coating solution was dried on a hot plate at 100° C. for 30 minutes, followed by vacuum-drying at 180° C. for 12 hours. Therefore, a cathode active material layer is formed on top of the cathode current collector. The total thickness of the cathode current collector and the cathode active material layer after drying was about 120 µm or less or more.

The cathode was pressed by using a uniaxial press device at a pressure of 3 tons to perform first press molding. A density of the cathode after the press molding was 2.33 g/cc. The cathode was cut by using a Thomson blade having a diameter ($\phi$) of 11 mm.

19-2. Anode Preparation

A copper foil current collector having a thickness of 20 µm was prepared as an anode current collector, and a lithium metal foil having a thickness of 30 µm was attached thereto to prepare an anode. The anode was cut with a Thomson blade having a diameter ($\phi$) of 13 mm.

19-3. Preparation of Non-Aqueous Electrolyte Secondary Battery

A porous polyethylene film ($\phi$: 15.5 mm; thickness: 12 µm) was used as a separator. The separator was disposed between the cathode and the anode, and thus an electrode stack was prepared. The electrode stack was processed as a 2032 coin half cell.

Subsequently, ethylene carbonate and dimethyl carbonate were mixed at a volume ratio of 3:7 to prepare a non-aqueous solvent, and lithium hexafluorophosphate ($LiPF_6$) was dissolved in the solvent at a concentration of 1.3 mol/L to prepare an electrolyte solution. The electrolyte solution was injected to the 2032 coin half cell to impregnate the separator with the electrolyte solution. Therefore, a non-aqueous electrolyte secondary battery was manufactured.

Theoretical densities of NCA and acetylene black were 4.6 g/cc and 2.1 g/cc, each respectively. Therefore, a theoretical density of the cathode active material layer was 4.53 g/cc (=4.6×0.97+2.1×0.03), and a relative density of the cathode active material layer was 51.4% (=2.33/4.53).

TABLE 1

| | Ra (µm) | Rz (µm) | Volume density after pre-pressing (※1) | | Relative Density (with respect to net density) | | Thickness of solid electrolyte layer in test cell (µm) | Short-circuit after preparation of test cell | Initial capacity Relative to Example 1 | Capacity retention after 50 cycles |
|---|---|---|---|---|---|---|---|---|---|---|
| | | | Cathode active material layer (g/cc) | Solid electrolyte layer (g/cc) | Cathode active material layer (%) | Solid electrolyte layer (%) | | | | |
| Ex. 1 | 0.4 | 1.7 | 2.27 | 1.56 | 64.9 | 86.7 | 85 | No | 100 | 83% |
| Ex. 2 | 0.8 | 3.1 | 2.29 | 1.55 | 65.4 | 86.1 | 89 | No | 99 | 78% |
| Ex. 3 | 0.4 | 1.6 | 2.24 | 1.53 | 64.0 | 85.0 | 92 | No | 96 | 81% |
| Ex. 4 | 0.2 | 1.7 | 2.51 | 1.68 | 71.7 | 93.3 | 78 | No | 103 | 86% |
| Ex. 5 | 0.7 | 2.4 | 2.27 | 1.57 | 64.9 | 87.2 | 88 | No | 99 | 81% |
| Ex. 6 | 1.0 | 4.1 | 2.28 | 1.54 | 65.1 | 85.6 | 90 | No | 100 | 77% |
| Ex. 7 | 0.2 | 1.5 | 3.82 | 1.77 | 88.2 | 98.3 | 72 | No | 88 | 85% |
| Ex. 8 | 0.5 | 2.4 | 2.27 | 1.56 | 64.9 | 86.7 | 86 | No | 98 | 75% |
| CEx. 1 | 1.4 | 7.4 | 2.23 | 1.57 | 63.7 | 87.2 | 90 | No | 99 | Short-circuit at cycle 15 |
| CEx. 2 | 1.2 | 3.8 | 1.64 | 1.28 | 46.9 | 71.1 | 122 | Yes | — | — |
| CEx. 3 | 1.1 | 4.5 | 2.24 | 1.56 | 64.0 | 86.7 | 88 | No | 101 | Short-circuit at cycle 28 |

TABLE 1-continued

| | Ra (μm) | Rz (μm) | Volume density after pre-pressing (※1) Cathode active material layer (g/cc) | Volume density after pre-pressing (※1) Solid electrolyte layer (g/cc) | Relative Density (with respect to net density) Cathode active material layer (%) | Relative Density (with respect to net density) Solid electrolyte layer (%) | Thickness of solid electrolyte layer in test cell (μm) | Short-circuit after preparation of test cell | Initial capacity Relative to Example 1 | Capacity retention after 50 cycles |
|---|---|---|---|---|---|---|---|---|---|---|
| CEx. 4 | 1.1 | 4.7 | 1.64 | 1.53 | 46.9 | 85.0 | 88 | No | 96 | Short-circuit at cycle 19 |
| CEx. 5 | 0.7 | 3.3 | 2.31 | 1.24 | 66.0 | 68.9 | 135 | Yes | — | — |
| CEx 6 | 1.5 | 9.2 | 2.26 | 1.53 | 64.6 | 85.0 | 184 | No | 97 | Short-circuit at cycle 42 |
| CEx. 7 | 1.6 | 10.5 | 1.59 | 1.27 | 45.4 | 70.6 | 118 | Yes | — | — |
| CEx. 8 | 1.5 | 6.4 | 2.24 | 1.55 | 64.0 | 86.1 | 88 | No | 97 | SShort-circuit at cycle 8 |
| REx. 1 | 1.4 | 8.5 | 2.24 | 1.54 | 64.0 | 85.6 | 379 | No | 94 | 75% |
| REx. 2 | 1.4 | 7.2 | 2.24 | 1.56 | 64.0 | 86.7 | 89 | No | 102 | 76% |
| REx. 3 | 1.1 | 4.0 | 2.33 | — | 51.4 | — | — | No | 101 | 87% |

Ex = Example
CEx = Comparative Example
REx = Reference Example
※1 Volume density after main-pressing when pre-pressing is not performed According to Table 1, Examples 1 to 7 provided suitable properties, did not have a short-circuit immediately after fabrication, and the capacity retentions were also large (in other words, a short-circuit may not occur). Also, in Example 7, the amorphous solid electrolyte was used, and thus the initial capacity was slightly less than those of Examples 1 to 6. However, the value was not a problem in the practical use. In Comparative Example 1, the cathode active material layer pressing process and the solid electrolyte layer alone pressing process were not performed, and thus the interface B was rough. As a result, a short-circuit occurred early during a charging and discharging process.

In Comparative Example 2, since the pressing pressure was low, the interface B was rough, and the relative density of each layer was small. In this regard, a short-circuit occurred immediately after fabrication of the test cells. In Comparative Examples 3 and 4, the cathode active material layer pressing process was not performed, and thus the interface B was rough. In this regard, a short-circuit occurred early during a charging and discharging process. In Comparative Example 4, the first intermediate stack pressing process was not performed, and thus the relative density of the cathode active material layer also reduced. In Comparative Example 5, the solid electrolyte layer alone pressing process was not performed, and thus the relative density of the solid electrolyte layer was reduced. In this regard, a short-circuit occurred immediately after fabrication of the test cells. The thickness of the solid electrolyte layer also increased. In Comparative Example 6, since the solid electrolyte layer was thicker than that prepared in Comparative Example 1, the number of cycles at which a short-circuit occurred increased slightly, but the short-circuit could not be avoided. In Comparative Example 7, since the pre-pressing process was not performed, not only the interface B was rough, but the relative density of each layer also reduced. As a result, a short-circuit occurred immediately after fabrication of the test cells.

Reference Example 1 had a solid electrolyte layer in Comparative Example 1 with an increased thickness. The increased thickness of the solid electrolyte layer could suppress the short-circuit, but the energy density was very small. In Reference Example 2, an anode active material was used as a graphite system in Comparative Example 1. When the anode active material is a graphite system, the energy density becomes small. Reference Example 3 prepared a non-aqueous electrolyte secondary battery. Compared with Examples 1 to 7, characteristics of the batteries prepared in Example 1 to 7 are similar to those of Reference Example 3. Thus, Examples 1-7 may have the advantages of an all-solid secondary battery (e.g., better safety), at the same time taking the characteristics of a battery similar to a non-aqueous electrolyte secondary battery into account.

As previously described, according to one or more embodiments, when an anode active material layer includes lithium metal, a short-circuit may be prevented.

It should be understood that embodiments described herein should be considered in a descriptive sense only and not for purposes of limitation. Descriptions of features, advantages, or aspects within each embodiment should be considered as available for other similar features, advantages, or aspects in other embodiments.

While one or more embodiments have been described with reference to the figures, it will be understood by those of ordinary skill in the art that various changes in form and details may be made therein without departing from the spirit and scope as defined by the following claims.

What is claimed is:
1. An all-solid secondary battery comprising:
a cathode comprising a cathode active material layer;
an anode comprising anode active material layer; and
a solid electrolyte layer comprising a sulfide solid electrolyte between the cathode active material layer and the anode active material layer,
wherein
an arithmetic mean roughness of an interface between the cathode active material layer and the solid electrolyte layer is about 0.01 micrometers to about 1 micrometer, a relative density of the solid electrolyte layer is equal to or greater than about 80% and less than about 100%,
a maximum height roughness of the interface between the cathode active material layer and the solid electrolyte layer is about 0.01 micrometers to about 4.5 micrometers, and
the anode active material layer comprises lithium.

2. The all-solid secondary battery of claim 1, wherein the relative density of the cathode active material layer is equal to or greater than about 60% and less than about 100%.

3. The all-solid secondary battery of claim 1, wherein a maximum height roughness of the interface between the cathode active material layer and the solid electrolyte layer is about 0.1 micrometers to about 3.5 micrometers.

4. The all-solid secondary battery of claim 1, wherein the cathode active material layer comprises a cathode active material and a solid electrolyte.

5. The all-solid secondary battery of claim 1, wherein the cathode active material layer comprises a lithium transition metal oxide with a layered rock-salt structure.

6. The all-solid secondary battery of claim 1, wherein the cathode active material layer comprises a compound represented by $LiNi_xCo_yAl_zO_2$, $LiNi_{x'}Co_{y'}Mn_{z'}O_2$, or a combination thereof,
wherein x, y, and z satisfy $0<x<1$, $0<y<1$, $0<z<1$, and $x+y+z=1$, and x', y', and z' satisfy $0<x'<1$, $0<y'<1$, $0<z'<1$, and $x'+y'+z'=1$.

7. The all-solid secondary battery of claim 6, wherein the cathode active material layer comprises a compound represented by $LiNi_xCo_yAl_zO_2$, $LiNi_{x'}Co_{y'}Mn_{z'}O_2$, or a combination thereof,
wherein x, y, and z satisfy $0.7<x<1$, $0<y<1$, $0<z<1$, and $x+y+z=1$, and x', y', and z' satisfy $0.7<x'<1$, $0<y'<1$, $0<z'<1$, and $x'+y'+z'=1$.

8. The all-solid secondary battery of claim 1, wherein the cathode active material layer further comprises a binder.

9. The all-solid secondary battery of claim 8, wherein the binder comprises a vinylidene fluoride/hexafluoropropylene copolymer, polyvinylidene fluoride, polyacrylonitrile, polymethyl methacrylate, polytetrafluoroethylene, a styrene butadiene rubber polymer, or a combination thereof.

10. The all-solid secondary battery of claim 1, wherein a thickness of the solid electrolyte layer is about 5 micrometers to about 100 micrometers.

11. The all-solid secondary battery of claim 1, wherein the sulfide solid electrolyte layer comprises $Li_{7-a}PS_{6-a}X_a$ wherein X is F, Cl, Br, I, or a combination thereof, $0 \leq a<2$,
$aLi_2S-(1-a)P_2S_5$ wherein $0<a<1$,
$aLi_2S-bP_2S_5-cLiX$ wherein X is F, Cl, Br, I, or a combination thereof, $0<a<1$, $0<b<1$, $0<c<1$, and $a+b+c=1$,
$aLi_2S-bP_2S_5-cLi_2O$ wherein $0<a<1$, $0<b<1$, $0<c<1$, and $a+b+c=1$,
$aLi_2S-bP_2S_5-cLi_2O-dLiI$ wherein $0<a<1$, $0<b<1$, $0<c<1$, $0<d<1$ and $a+b+c+d=1$,
$aLi_2S-(1-a)SiS2$ wherein $0<a<1$,
$aLi_2S-bSiS_2-cLiI$ wherein $0<a<1$, $0<b<1$, $0<c<1$, and $a+b+c=1$,
$aLi_2S-bSiS_2-cLiBr$ wherein $0<a<1$, $0<b<1$, $0<c<1$, and $a+b+c=1$,
$aLi_2S-bSiS_2-cLiCl$ wherein $0<a<1$, $0<b<1$, $0<c<1$, and $a+b+c=1$,
$aLi_2S-bSiS_2-cB_2S_3-dLiI$ wherein $0<a<1$, $0<b<1$, $0<c<1$, $0<d<1$ and $a+b+c+d=1$,
$aLi_2S-bSiS_2-cP_2S_5-dLiI$ wherein $0<a<1$, $0<b<1$, $0<c<1$, $0<d<1$ and $a+b+c+d=1$,
$aLi_2S-(1-a)B_2S_3$ wherein $0<a<1$,
$aLi_2S-bP_2S_5-cZ_mS_n$ wherein m and n are each independently positive integers between 1 and 10, Z is Ge, Zn, or Ga, $0<a<1$, $0<b<1$, $0<c<1$, and $a+b+c=1$,
$aLi_2S-(1-a)GeS_2$ wherein $0<a<1$,
$aLi_2S-bSiS_2-cLi_3PO_4$ wherein $0<a<1$, $0<b<1$, $0<c<1$, and $a+b+c=1$, or
$aLi_2S-bSiS_2-cLi_pMO_q$ wherein p and q are each independently positive integers between 1 and 10, $0<a<1$, $0<b<1$, $0<c<1$, and $a+b+c=1$, and M is P, Si, Ge, B, Al, Ga, or In.

12. The all-solid secondary battery of claim 1, wherein the solid electrolyte layer comprises sulfur, phosphorus, and lithium.

13. The all-solid secondary battery of claim 1 further comprising a cathode current collector.

14. The all-solid secondary battery of claim 1, wherein a capacity retention of the all-solid secondary battery after 50 charge/discharge cycles is greater than about 75% and equal to or less than about 86%.

15. The all-solid secondary battery of claim 1, wherein a closed circuit voltage of the all-solid secondary battery is greater than about 2.4 volts to about 4.0 volts.

16. A method of preparing the all-solid secondary battery of claim 1, the method comprising:
providing the cathode active material layer;
providing the anode active material layer;
providing the solid electrolyte layer comprising the sulfide solid electrolyte;
pre-pressing the cathode active material layer and the solid electrolyte; and
pressing an electrode stack comprising the pre-pressed cathode active material layer, the pre-pressed the solid electrolyte layer, and the anode active material layer to prepare the all-solid secondary battery,
wherein the pre-pressing of the cathode active material layer and the solid electrolyte comprises
pressing the cathode active material layer to provide a pressed cathode active material layer before stacking the pressed cathode active material layer on the solid electrolyte layer; and
pressing the solid electrolyte layer to provide a pressed solid electrolyte layer before stacking the pressed solid electrolyte layer on the anode active material layer.

17. The method of claim 16, wherein the all-solid secondary battery further comprises a cathode current collector, and wherein the pressing of the cathode active material layer comprises pressing the cathode active material layer together with the cathode current collector.

18. The method of claim 16, wherein the pressing of the solid electrolyte layer comprises pressing the solid electrolyte layer alone and before the stacking of the pressed cathode active material layer.

19. The method of claim 18, wherein the pressing of the solid electrolyte layer comprises:
pressing the solid electrolyte layer alone; and
pressing a first intermediate stack, which comprises the pressed solid electrolyte layer and the pressed cathode active material layer.

20. The method of claim 16, wherein the pressing of the solid electrolyte layer comprises pressing a second intermediate stack, which comprises the pressed solid electrolyte layer and the pressed cathode active material layer.

\* \* \* \* \*